(12) United States Patent
Howe et al.

(10) Patent No.: US 11,203,404 B2
(45) Date of Patent: Dec. 21, 2021

(54) COMPOSITE TOUGHENING USING THREE DIMENSIONAL PRINTED THERMOPLASTIC PINS

(71) Applicant: The Boeing Company, Chicago, IL (US)

(72) Inventors: Christopher A. Howe, Port Melbourne (AU); Kariza Martin, Hoppers Crossing (AU); Michelle Louise Gee, Bundoora (AU); Adrian Mouritz, Melbourne (AU)

(73) Assignee: THE BOEING COMPANY, Chicago, IL (US)

( * ) Notice: Subject to any disclaimer, the term of this patent is extended or adjusted under 35 U.S.C. 154(b) by 539 days.

(21) Appl. No.: 15/957,086

(22) Filed: Apr. 19, 2018

(65) Prior Publication Data

US 2019/0322347 A1     Oct. 24, 2019

(51) Int. Cl.
| | |
|---|---|
| *B64C 1/12* | (2006.01) |
| *B33Y 10/00* | (2015.01) |
| *B33Y 70/00* | (2020.01) |
| *B33Y 80/00* | (2015.01) |
| *B29C 64/118* | (2017.01) |
| *D03D 1/00* | (2006.01) |
| *B29K 101/12* | (2006.01) |

(52) U.S. Cl.
CPC .............. *B64C 1/12* (2013.01); *B29C 64/118* (2017.08); *B33Y 10/00* (2014.12); *B33Y 70/00* (2014.12); *B33Y 80/00* (2014.12); *D03D 1/00* (2013.01); *B29K 2101/12* (2013.01); *D10B 2101/12* (2013.01); *D10B 2505/12* (2013.01)

(58) Field of Classification Search
None
See application file for complete search history.

(56) References Cited

U.S. PATENT DOCUMENTS

| | | | |
|---|---|---|---|
| 4,001,366 A | 1/1977 | Brumlik | |
| 6,422,848 B1 | 7/2002 | Allen et al. | |
| 7,981,495 B2 | 7/2011 | Kim et al. | |
| 8,312,827 B1 * | 11/2012 | Free ...................... | D05C 17/00 112/475.08 |
| 9,845,556 B2 | 12/2017 | Meure et al. | |

(Continued)

FOREIGN PATENT DOCUMENTS

| | | | |
|---|---|---|---|
| EP | 3000922 | | 3/2016 |
| WO | 2017100783 | | 6/2017 |
| WO | WO2017100783 | * | 6/2017 |

OTHER PUBLICATIONS

Quick Reference: 7 Families of Additive Manufacturing, copyright 2015-2018 by Hybrid Manufacturing Technologies, retrieved from http://www.hybridmanutech.com/uploads/2/3/6/9/23690678/7_families_of_3d_printing_by_hybrid_v11_2p.pdf on Jul. 7, 2019, 2 pages. (Year: 2015).

(Continued)

*Primary Examiner* — Shawn Mckinnon
(74) *Attorney, Agent, or Firm* — Gates & Cooper LLP

(57) ABSTRACT

A composite article including a plurality of layers each comprising bundles of fibers separated by spaces; pins bonded to a side of at least one of bundles and extending or built through the spaces between the layers; and a resin combined with the layers and the pin. The pins form a physical barrier preventing or reducing propagation of cracks in an x-y plane of the composite article.

22 Claims, 20 Drawing Sheets

(56) References Cited

U.S. PATENT DOCUMENTS

| | | |
|---|---|---|
| 10,081,722 B2 | 9/2018 | Meure et al. |
| 2002/0112325 A1 | 8/2002 | Keohan et al. |
| 2010/0065367 A1 | 3/2010 | Vermilyea et al. |
| 2012/0156422 A1 | 6/2012 | Kozar et al. |
| 2015/0024203 A1* | 1/2015 | Choi .................. B29C 37/0082 428/399 |
| 2016/0031182 A1 | 2/2016 | Quinn et al. |
| 2016/0083871 A1 | 3/2016 | Meure et al. |
| 2016/0089853 A1 | 3/2016 | Meure et al. |
| 2016/0114532 A1* | 4/2016 | Schirtzinger ......... B29C 64/147 428/411.1 |

OTHER PUBLICATIONS

Extended European Search Report dated Oct. 4, 2019 for European Patent Application No. 19167994.3.

Qin, Z., et al., "Structural optimization of 3D-printed synthetic spiderwebs for high strength", Nature Communications, May 2015, pp. 1-7, vol. 6.

PCT International Search Report and Written Opinion dated Oct. 7, 2019 for PCT Application No. PCT/US2019/026542.

Extended European Search Report dated Sep. 9, 2019 for European Patent Application No. 19170124.2.

Extended European Search Report dated Oct. 7, 2019 for European Patent Application No. 19170386.7.

Nguyen, A.T.T., et al., "Hierarchical surface features for improved bonding and fracture toughness of metal-metal and metal-composite bonded joints", International Journal of Adhesion & Adhesives, 2016, pp. 81-92, vol. 66.

Vaidya, U.K., et al., "Affordable Processing and Characterization of Multi-Functional Z-Pin Reinforced VARTM Composites", Proceedings of the 13th International Conference on Composite Materials, 2001, pp. 1-10.

Heimbs, S., et al., "Failure behaviour of composite T-joints with novel metallic arrow-pin reinforcement", Composite Structures, 2014, pp. 16-28, vol. 110.

* cited by examiner

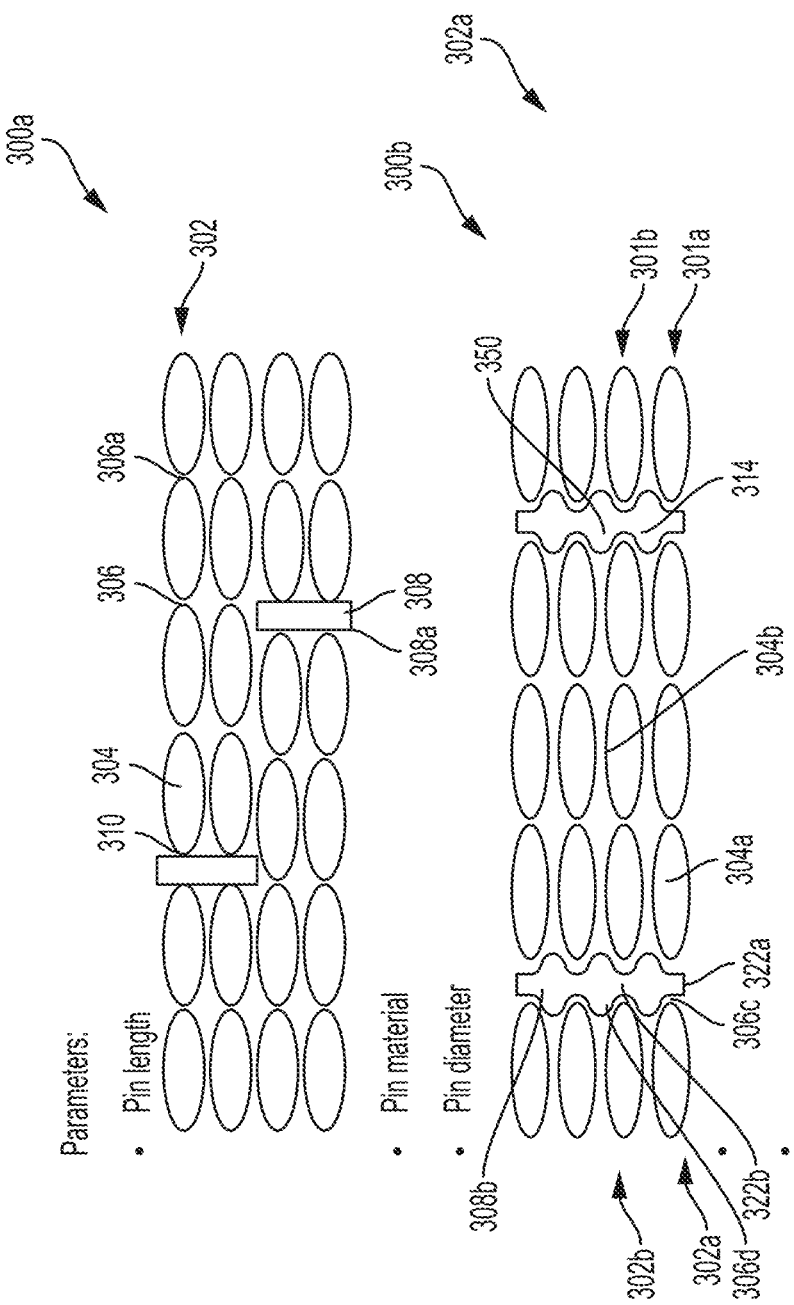

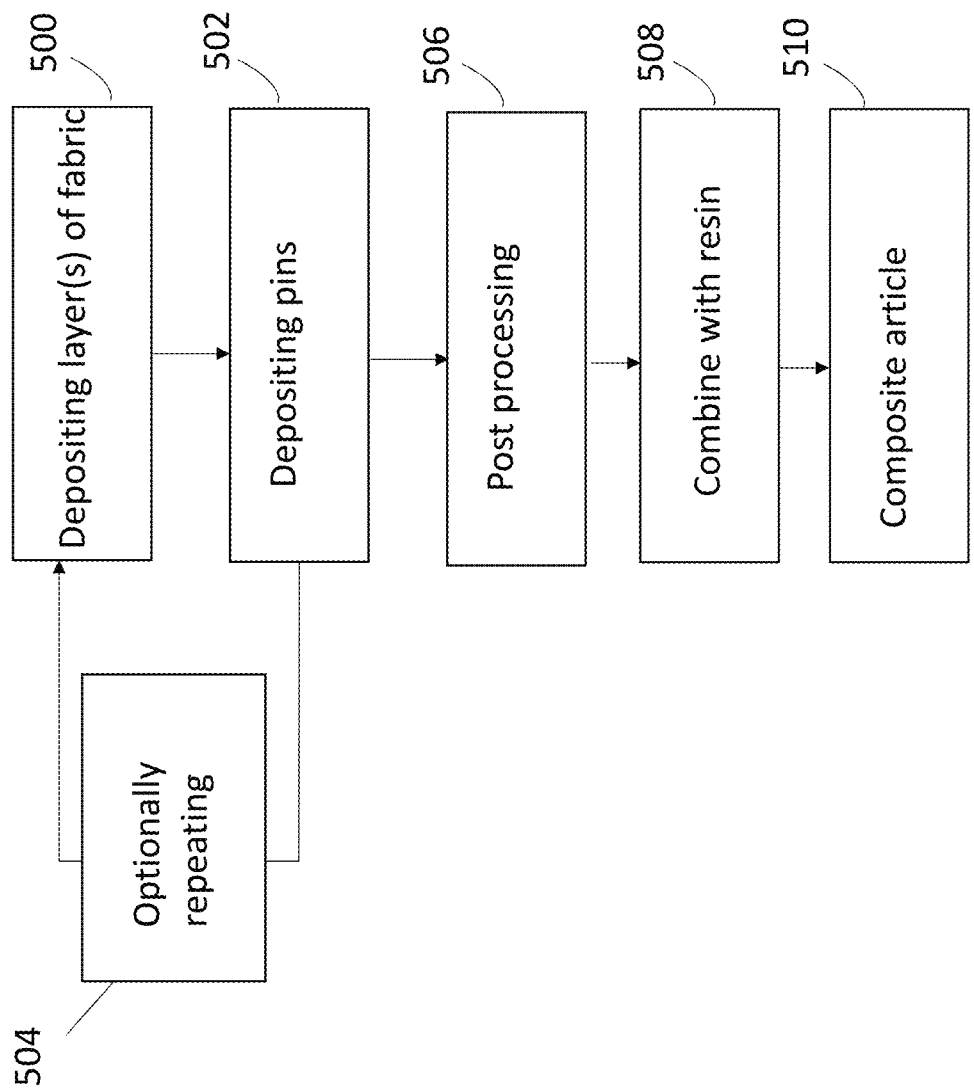

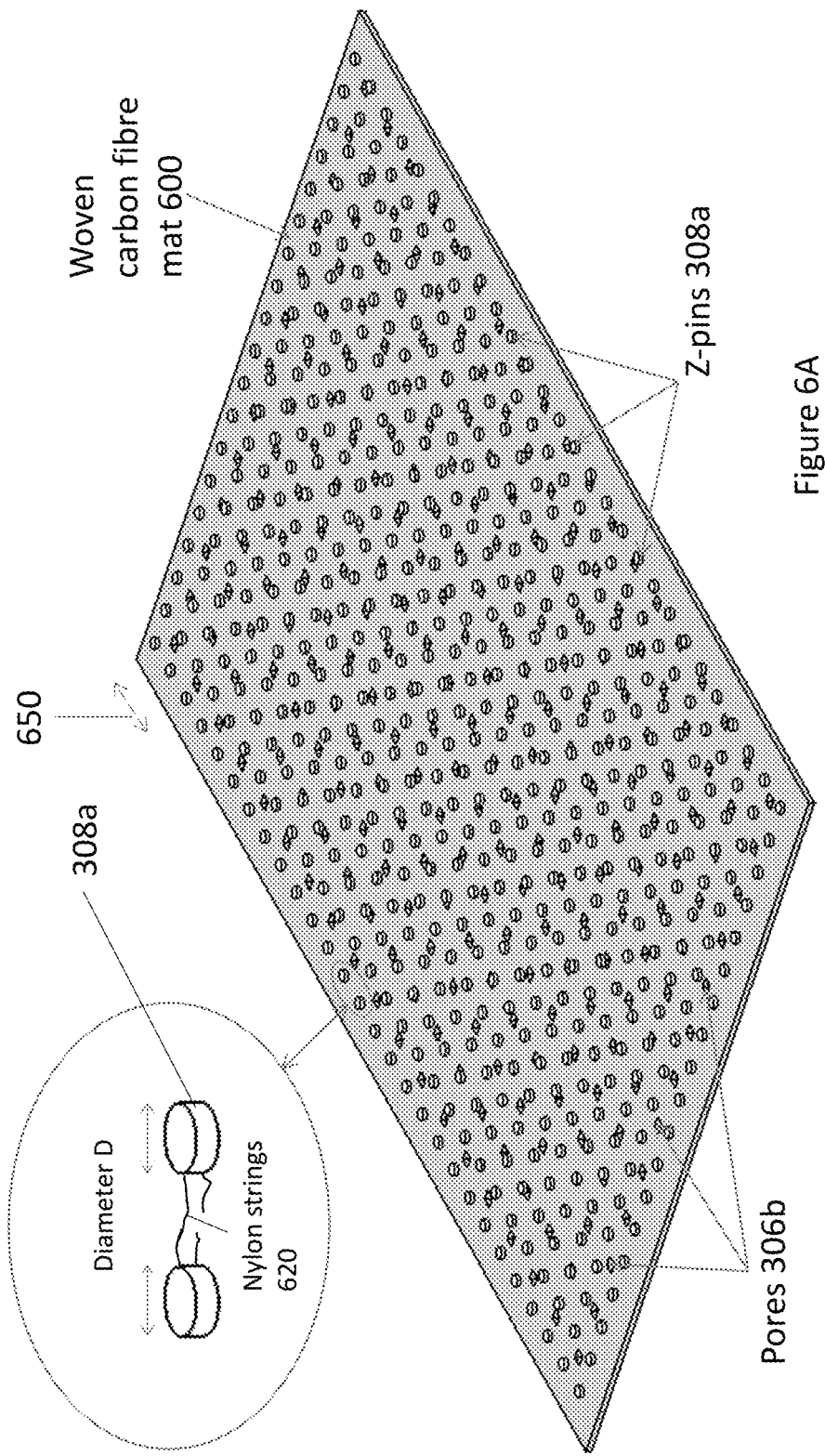

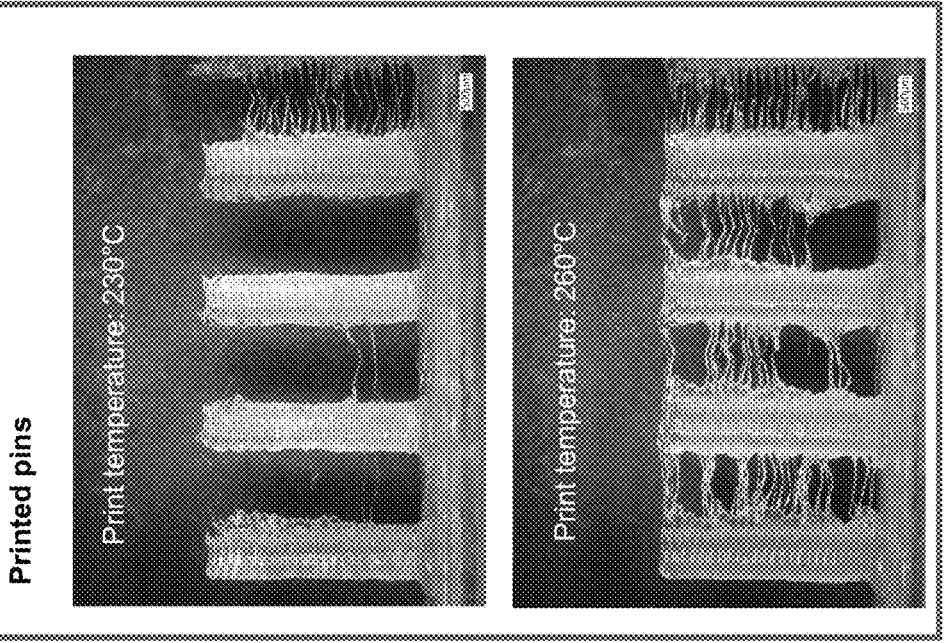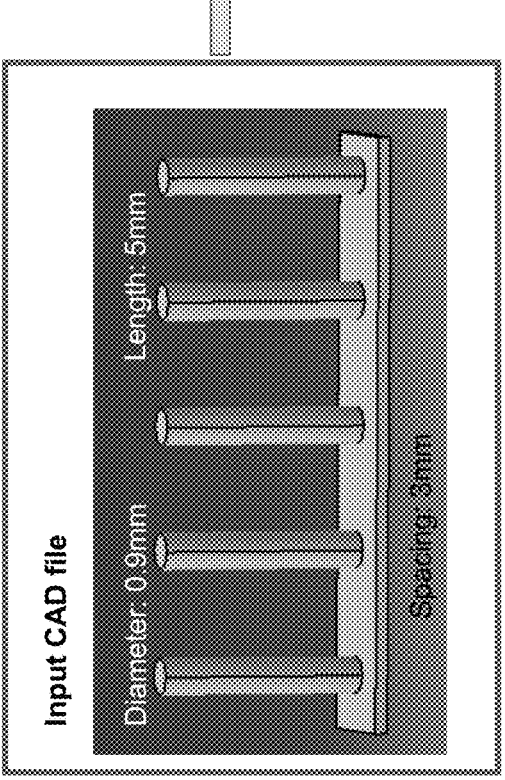
Figure 7A, Figure 7B, Figure 7C, Figure 7D: 3D Printed Pins Example

Continuous z-pin Process parameters

| Parameter | Range | Effect on geometry | Effect on mechanical properties |
|---|---|---|---|
| Pin pattern (no. of pins) | 1 to 5 rows (7 pins in a row) | • More pins will result in poorer adhesion between the layers and thinner z-pins due to stringiness from the nylon | • More pins printed in single print result in poorer tensile strength and modulus |
| Pin Diameter (mm) | ≥ 0.7mm | • Larger diameters will lead to better dimensional accuracy | • Larger layer height leads to better mechanical properties |
| Spacing (mm) | 5 to 10mm | • The larger the spacing, the less stringiness but inconsistent diameters | • Larger spacing leads to poorer tensile strength and modulus |
| Nozzle Temperature (°C) | 230, 245, 260 | • Higher temperature leads to more features on the pin and thicker than design diameter<br>• Better adhesion to the carbon fibre (non-continuous pins) | • Higher temperature leads to better interlayer adhesion and therefore higher tensile strength and modulus of pins |
| Layer Height (mm) | 0.15 to 0.3 mm | • Larger layer heights have more stringiness<br>• Larger layer heights result in bigger corrugation | • Larger layer heights lead to poorer mechanical properties |
| Extrusion speed (mm/s) | 30 – 60mm/s | • Too fast results in poor adhesion to previous layer and nylon gets carried away | • Slower speeds lead to better interlayer bonding and higher mechanical properties |

Note:
- Factors that also affect the pin's geometric and mechanical properties are cooling rate and nozzle size.
- The longer the time between deposition, the poorer the mechanical properties of the pin due to larger pores and consequent poor interlayer adhesion

Figure 9A

Discontinuous z-pin process parameters

| Parameter | Parameter | Effect on resulting geometry |
|---|---|---|
| Pin Pattern (no. of pins) | Not limited | • Pin pattern not limited as each printed pin layer attaches itself to the carbon fibre mat |
| Pin Diameter (mm) | ≥ 0.7mm | • Larger diameters will lead to better dimensional accuracy |
| Spacing (m) | 5 to 10mm | • The larger the spacing, the less stringiness but inconsistent diameters |
| Nozzle temperature (°C) | 230, 245, 260 | • Higher temperature leads to more features on the pin and thicker than design diameter<br>• Better adhesion to the carbon fibre (non-continuous pins) |
| Layer height (mm) | 0.15 to 0.3 mm | • Larger layer heights have more stringiness<br>• Larger layer heights result in bigger corrugation<br>• Larger layer height leads to better adhesion to carbon fibre |
| Extrusion Speed (mm/s) | 30 – 60mm/s | • Too fast results in poor adhesion to previous layer and nylon gets carried away |

Figure 9B

COMPOSITE TOUGHENING USING THREE DIMENSIONAL PRINTED THERMOPLASTIC PINS

BACKGROUND

1. Field

The present disclosure describes novel composite structures and methods of fabricating the same.

2. Description of the Related Art

Composites are replacing metals as structural materials because of their light weight, relative strength, and their ability to be molded into more complex shapes. However, conventional composite structures can exhibit cracking (in particular delaminations) under stress. Conventional composite toughening techniques in the form of interlayers (such as thermoplastic veils and particles) exhibit limited effectiveness in controlling failure at high stress concentration regions. In many cases, a toughened film adhesive is required to achieve the required through thickness toughness properties. Moreover, mechanical fasteners may be the default for acceptable design. This is particularly a concern for integrated aircraft structures where areas of high stress (100) occur throughout the structure thickness such as at a joint radius (see FIG. 1). Therefore, a crack (102) that develops at the joint radius would only need to jump to an untoughened layer for brittle failure to occur. Such cracking might be mitigated using a through thickness toughening technique. However, conventional through thickness methods (such as film adhesives) are not employed in liquid molded structures due to disruption of the resin flow path during infusion, leading to defects such as voids, porosity and dry spots. Such defects significantly lower in-plane properties of the composite laminate structure.

Examples of through thickness techniques and their constraints are listed below:
- Z-pins: used for stacked reinforcements but are not currently used due to microstructural imperfections that occur during the insertion process.
- Stitches: used for toughening dry fiber preforms but are not currently used due to microstructural imperfections that occur during the insertion process.
- Three dimensional (3D) woven/3D knitted/3D braided preforms that are typically applied with liquid molding methods. However, due to fiber misalignment within the 3D preform caused during the manufacturing processes, these preforms are limited to specific geometries and are not readily applied at integrated aircraft joints.

FIG. 2 shows an Ashby plot characterizing conventional veil, stitch and z-pinned toughened composites and highlights the gap where in plane properties have been measured as Open Hole Compression (OHC) strength as a function of Mode I Interlaminar Fracture Toughness (Gic). FIG. 2 shows that through thickness methods significantly increase mode I fracture toughness compared to veils and that an increase up to 1400% is possible with z-pins. However, through thickness reinforcements reduce damage tolerance in terms of OHC strength and other in-plane properties due to the microstructural imperfections induced during their manufacturing process. Veils applied as interlayers, on the other hand, show a lower reduction in OHC, where less disruption to the fibers is caused during the application of veil to the fiber preform. However, the effective improvement in Gic is poor. Thus, the gap representing performance that has not been conventionally achieved is obtaining a high mode I fracture toughness without degradation of damage tolerance and in-plane properties using continuous through thickness reinforcements.

What is needed, then, is a through thickness technique that is continuous through the composite and does not reduce in-plane properties. The present invention satisfies this need.

SUMMARY

The present disclosure describes a composite article (300a, 300b, 300c, 300d) including including fiber tows (304); and a plurality of pins (308) combined with the plies (302). A plurality of the pins (308) pass through a different space (306) between the fiber tows (304) and one or more of the pins (308) are bonded to a surface (310) of at least one of the fiber tows (304). The pins (308) form physical barriers reducing propagation of cracks in the composite article (300a, 300b, 300c, 300d). A resin is typically combined with the plies (302) and the pins (308).

The composite article may be embodied in many ways. Examples include, but are not limited to, one or any combination of the following examples.

1. The composite article (300e), wherein the fiber tows (340a, 340b, 340c, 340d) are disposed in a plurality of plies (336a, 336b, 336c, 336d) or layers (338a, 338b, 338c, 338d), the spaces (342) are through a plurality of the layers (338a, 338b, 338c, 338d) or plies (336a, 336b, 336c, 336d), and the spaces (342) are bounded by fiber tows (340a, 340b, 340c, 340d) in different layers (338a, 338b, 338c, 338d) or different plies (336a, 336b, 336c, 336d).

2. The composite article (300a, 300b, 300c, 300d) wherein the pins (308) have different mechanical properties from one another.

3. The composite article (300a, 300b, 300c, 300d) wherein the pins (308) each fill at least 90% of a volume of the space (306) between the fiber tows (304).

4. The composite article (300a, 300b, 300c, 300d) wherein at least one of the fiber tows (304) comprises an undistorted fiber tow (612) and at least one of the pins (308) is bonded to the surface (616) of the undistorted fiber tow (612).

5. The composite article (300a, 300b, 300c, 300d) wherein at least one of the fiber tows (304) comprises an unfrayed fiber (614) and at least one of the pins (308) is bonded to the surface (618) of the unfrayed fiber (614).

6. The composite article (300c) wherein at least one of the pins (308c) is cylindrical.

7. The composite article (300b) wherein at least one of the pins (308b) has a non-uniform or irregular cross-section (330) along its length L.

8. The composite article (300b) wherein at least one of the pins (308b) is wider between the plies.

9. The composite article wherein one or more of the pins (308) bond to the resin and the fiber tow.

10. The composite article wherein one or more of the pins (308) are drawn between the spaces (306) from an anchor (602).

11. The composite article (300a) wherein at least one of the pins (308a) does not extend through all the plies (302).

12. The composite article (300b) wherein at least one of the pins (308c) extends through all of the plies (302).

13. The composite article (300a, 300b, 300c, 300d) wherein the fiber tows (304) each have a diameter of at least 2 mm and include at least 1000 fibers, and/or the spaces (306) each have a diameter of at least 2 mm, and/or the plies (302) each have a thickness in a range of 2-10 mm, and/or the pins (308) each have a thickness in a range of 2-5 mm, and/or the pins (308) each have a length in a range of 1-3 mm, and/or the composite article (300a, 300b, 300c, 300d) has a total thickness in a range of 10 mm-1 meter.

14. A joint comprising the composite article (300a, 300b, 300c, 300d).

The present disclosure further describes an integrated aircraft structure (1200), comprising a skin (1004), a stiffener (1006), and an interfacial region (1008) between the skin (1004) and the stiffener (1006). The interfacial region (1208) comprises a composite article (300a, 300b, 300c, 300d) including a plurality of plies (302) each including fiber tows (304); and a plurality of pins (308).

The present disclosure further describes a method of manufacturing a composite article (300a, 300b, 300c, 300d), comprising (a) providing a plurality of fiber tows (304) (which can be disposed in plies) and spaces (306) between or bounded by the fiber tows (304); and (b) depositing material (322) in a plurality of the spaces (306) so as to form a plurality of pins (308) each passing through a different one of the spaces (306). In one embodiment, the method comprises (i) depositing the material (322) from an outlet (450) onto a base layer and into one of the spaces (306) while moving the outlet (450) and the base relative to one another, first in an x-y plane and then in a z-direction, so as to form an anchor (602) on the base layer; (ii) moving the outlet (450) and the base layer relative to one another with no feed of the material (322) from the outlet (450), so that a portion of the anchor (602) is drawn to create the pin (308); (iii) releasing the pin (308) from the outlet (450) and moving the outlet (450) and the base layer relative to one another so that the outlet (450) is positioned above a next one of the spaces (306); and (iv) repeating steps (i)-(iii) so as to create the plurality of the pins (308).

In one or more examples, the method further comprises repeating steps (a) and (b) so that the material (322) is deposited in the spaces (306) ply (302) by ply (302) after each ply (302) is deposited, wherein at least some of the material (322) deposited in the spaces (306) in the next ply (302) is aligned with and connects to the material (322) deposited in the spaces (306) in the previous ply (302) so as to form the pins (308) extending through a plurality of the plies (302).

In one or more examples, the method further comprises repeating step (a) so as to obtain a plurality of the plies (302) deposited on top of one another; and after the repeating step, performing step (b) so as to form the pins (308) extending through at least some of the plies (302).

In yet further examples, the method further comprises heating the pins (308) and the ply (302) in a post processing step after the pins (308) have been formed, so as to increase bonding of the pins (308) to the fiber tows (304). Alternatively, in other examples, the method comprises depositing the material (322) using an additive manufacturing technique, wherein the pins (308) bond to the fiber tows (304) during the deposition of the material (322) using the additive manufacturing technique.

BRIEF DESCRIPTION OF THE DRAWINGS

Referring now to the drawings in which like reference numbers represent corresponding parts throughout:

FIGS. 3A, 3B, 3C, 3D, 3E, 3F, 3G and 3I are cross sectional schematics of exemplary composite articles comprising additively manufactured z-pins, wherein FIG. 3A illustrates an embodiment wherein the pins do not extend through all the layers, FIG. 3B illustrates an embodiment wherein the pins have a thicker cross section between the layers, FIG. 3C illustrates an embodiment of the composite article wherein the pins have a uniform thickness (smooth wall), FIG. 3D illustrates an embodiment of the composite article wherein the pins have thickened portions lying predominantly in between layers with a variable diameter along the vertical axis, FIG. 3E illustrates a continuous z-pin morphology that can be used in composite articles as described herein, FIG. 3F illustrates an embodiment wherein spaces are defined by fiber tows in different layers, FIG. 3G is a top view of FIG. 3F, FIG. 3I illustrates an embodiment including a layer coupled to the pins between the plies.

FIG. 5 is a flowchart illustrating a method of fabricating exemplary composite articles comprising z-pins described herein.

FIG. 6A illustrates a discontinuous z-pin morphology in a ply, according to one or more examples described herein.

FIGS. 6B and 6C illustrate a single pin layer and pins drawn from anchors on a dry fiber plain weave, according to exemplary embodiments described herein, wherein FIG. 6C is a close up view of FIG. 6B.

FIG. 7A illustrates an input computer aided design (CAD) for controlling the 3D printer so as to fabricate the pins described herein, FIGS. 7B and 7C illustrates the resulting printed pins fabricated using the CAD file of FIG. 7A, at nozzle temperatures of 230° C. and 260° C. respectively, and FIG. 7D is a table showing the dimensions of the fabricated pins illustrated in FIGS. 7B and 7C.

FIG. 9A is a table showing process parameters for making continuous z-pins, according to one or more examples.

FIG. 9B is a table showing process parameters for making discontinuous z-pins, according to one or more examples.

DESCRIPTION

Figure 1:
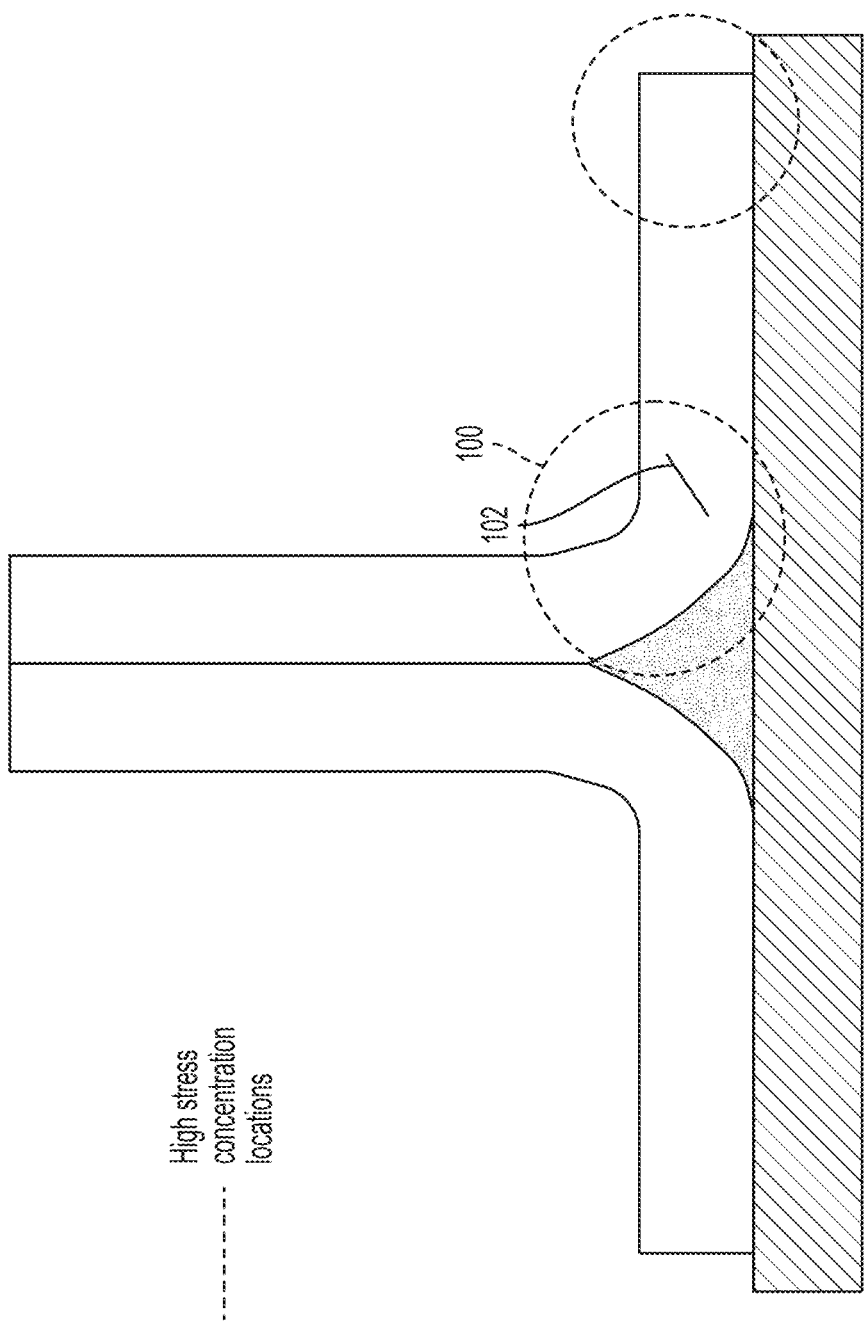
FIG. 1 illustrates high stress concentration regions in a T-Joint.
Figure 2:
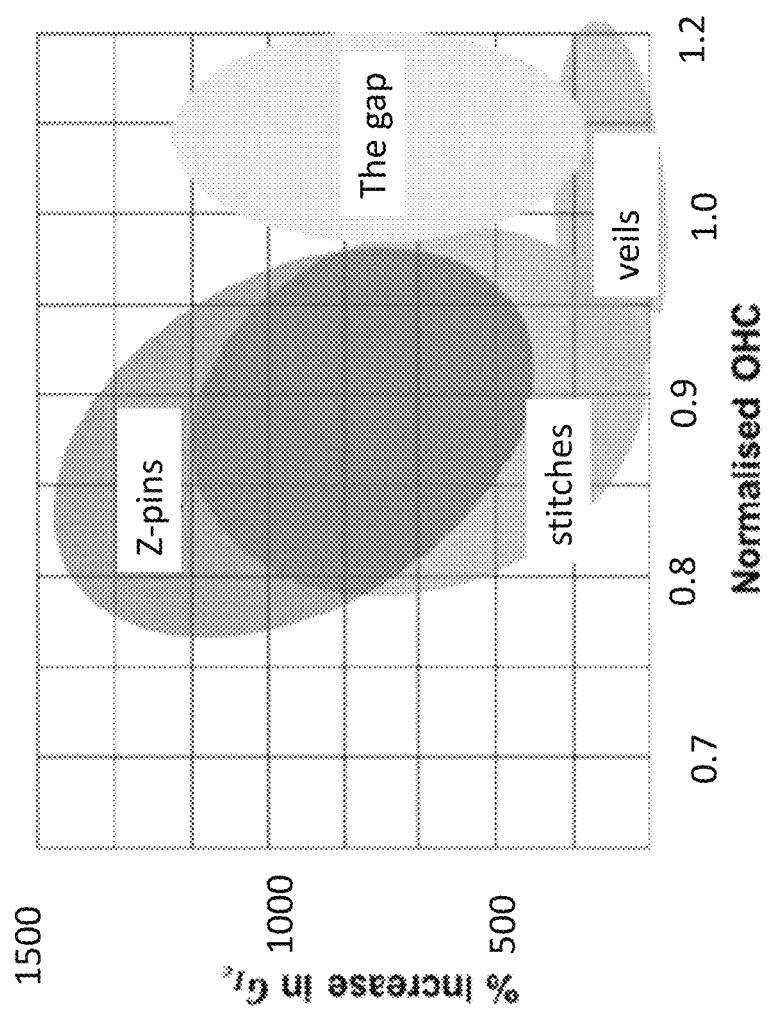
FIG. 2 illustrates the gap representing performance (in terms of achieving fracture toughness and maintaining in-plane properties) that is not achievable in conventional structures.

In the following description, reference is made to the accompanying drawings which form a part hereof, and which is shown, by way of illustration, several embodiments. It is understood that other embodiments may be utilized and structural changes may be made without departing from the scope of the present disclosure.

Technical Description
Example Structures

FIGS. 3A, 3B, 3C, and 3D illustrate composite articles (300a, 300b, 300c, 300d) including a plurality of plies (302) or layers (302a) each including fiber tows (304) separated by spaces (306) (e.g., pores 306a). The composite articles (300a, 300b, 300c, 300d) further include one or more pins (308), wherein each of the pins (308) pass through a different space (306) between the fiber tows (304), and each of the pins (308) are bonded to a surface (310) (any side, in x-y or z direction) of at least one of the fiber tows (304). The pins (308) extend through the spaces (306) between the fiber tows (304) and beyond each layer or ply (302) so as to form pillars or physical barriers (312) preventing or suppressing propagation of delamination cracks (102) (e.g., interlaminar, intralaminar, and/or translaminar cracks) in the composite article (300) and in any direction in the composite article (300).

FIG. 3A illustrates an embodiment of the composite article (300a, 300b, 300c, 300d) wherein a pin (308) extends through and above the height of the layer (301) or ply (302) comprising the fiber tows (304) and has a uniform thickness that is generally the thickness of the space (306). In this illustrative embodiment, the pin (308) is not through an entire thickness but is only present in a subset of all the layers (302a) or plies (302). In this form, the pin (308) is considered as a discontinuous pin (308a) located in the ply (302). Discontinuous pins allows tailoring of the toughness of the composite so as to minimize weight (e.g., pins are only placed where increased toughness is needed).

FIG. 3B illustrates an embodiment of the composite article (300b) wherein the pins (308) have thickened portions (314) lying predominantly in between the plies (302) or layers (301) (e.g., corn on cob structure). In one or more embodiments, such a roughened or "corn on the cob" type surface architecture, as opposed to a smooth cylindrical wall, may be used to achieve superior mechanical interlocking. In the embodiment of FIG. 3B, the pins (308) extend above and below the height of each individual ply (302) to create a through thickness pin throughout the complete thickness of multiple fiber layers. In this form, the pin 308 is considered a continuous pin (308b) located in the ply (302).

Figures 3C, 3D:
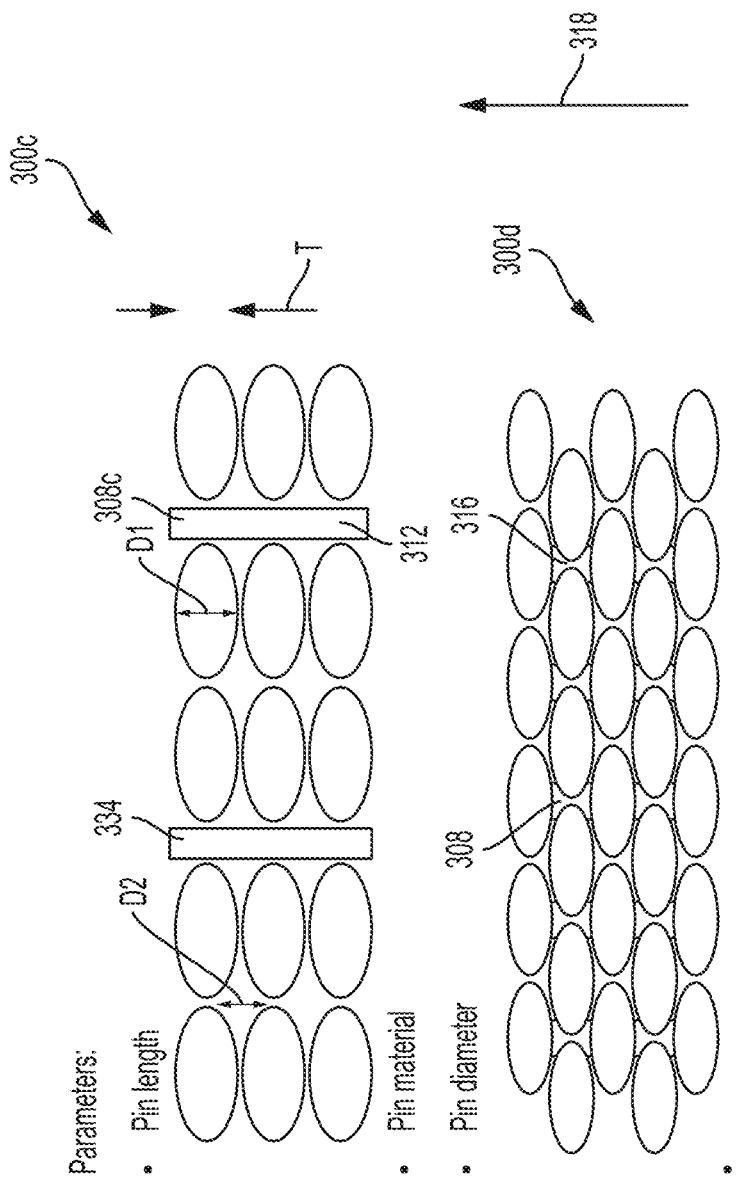

FIG. 3C illustrates an embodiment of the composite article (300c) wherein the pins (308) have a uniform thickness (smooth wall) and extend above and below the height of each individual ply (302) or layer (301) to create a through thickness pin (308c) throughout the complete thickness of the multiple layers (301) or plies (302).

FIG. 3D illustrates an embodiment of the composite article (300d) wherein the pins (308) have thickened portions (316) lying predominantly in between layers (301) or plies (302), with a variable diameter along the vertical axis (318). The pin (308) is not though an entire thickness bit is only present in a subset of all layers (301) or plies (302).

Figure 3E:
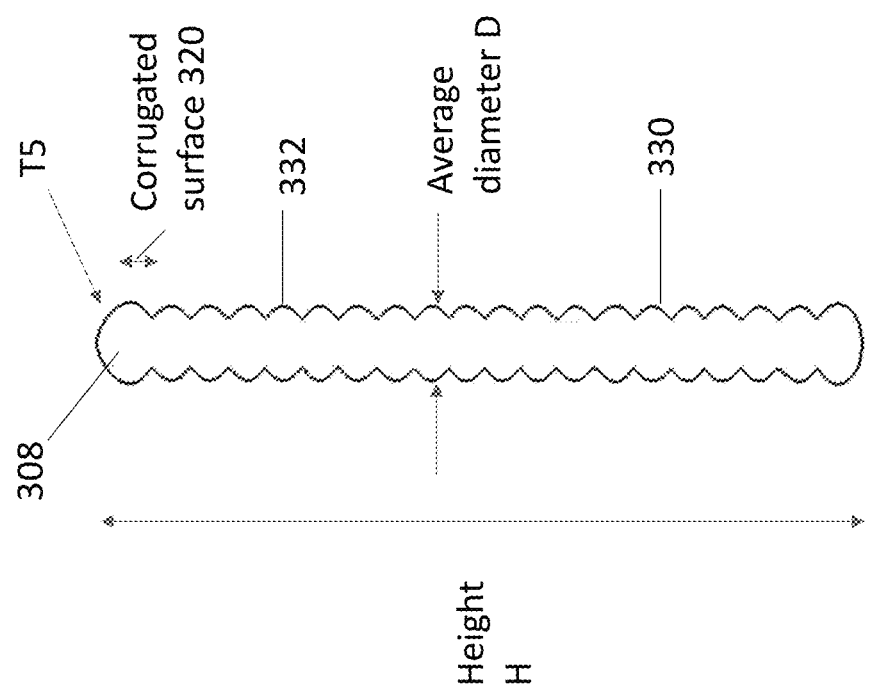

FIG. 3E illustrates the geometric features that can be controlled to form a pin (308), including height H, average diameter D, and uniformity of surface (330) of the pin (308). In one or more examples, the surface (330) is formed as corrugated surface (320) or non-uniform/irregular surface (332)). In other examples, the surface (330) is a smooth surface (334). Although not shown, the stringiness (e.g., viscosity and/or diameter) of each of the pins may also be controlled.

Figure 3G:
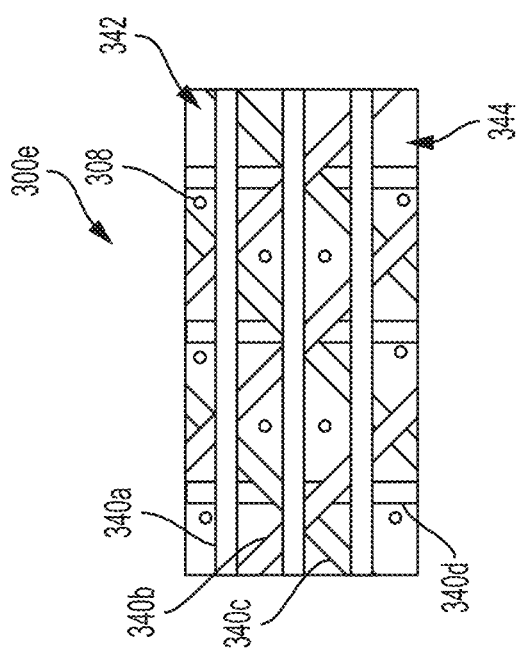
Figure 3F:
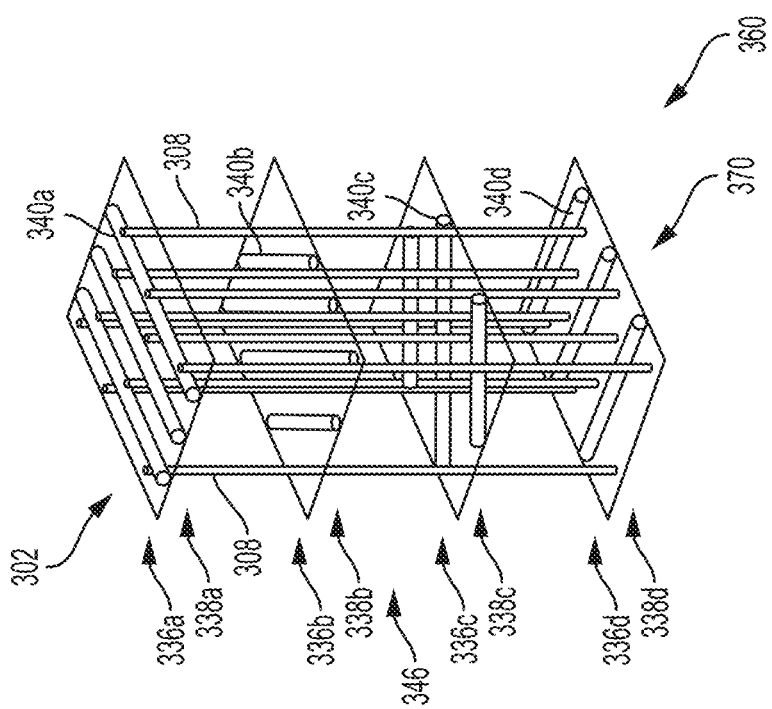

FIGS. 3F and 3G illustrate examples wherein the plies (302) or layers (301) in the composite article (300e) include a plurality or a stack (360) of plies (336a, 336b, 336c, 336d) or layers (338a, 338b, 338c, 338d) each having different orientations (370) of (e.g., unidirectional) fiber tows (340a, 340b, 340c, 340d). In this case, spaces (342) or pores (344) are created through a plurality of the layers (338a, 338b, 338c, 338d) or plies (336a, 336b, 336c, 336d) and the spaces (342) or pores (344) are bounded, defined, or walled by the fiber tows (340a, 340b, 340c, 340d) in different plies (336a, 336b, 336c, 336d) or different layers (338a, 338b, 338c, 338d).

Figure 6B:
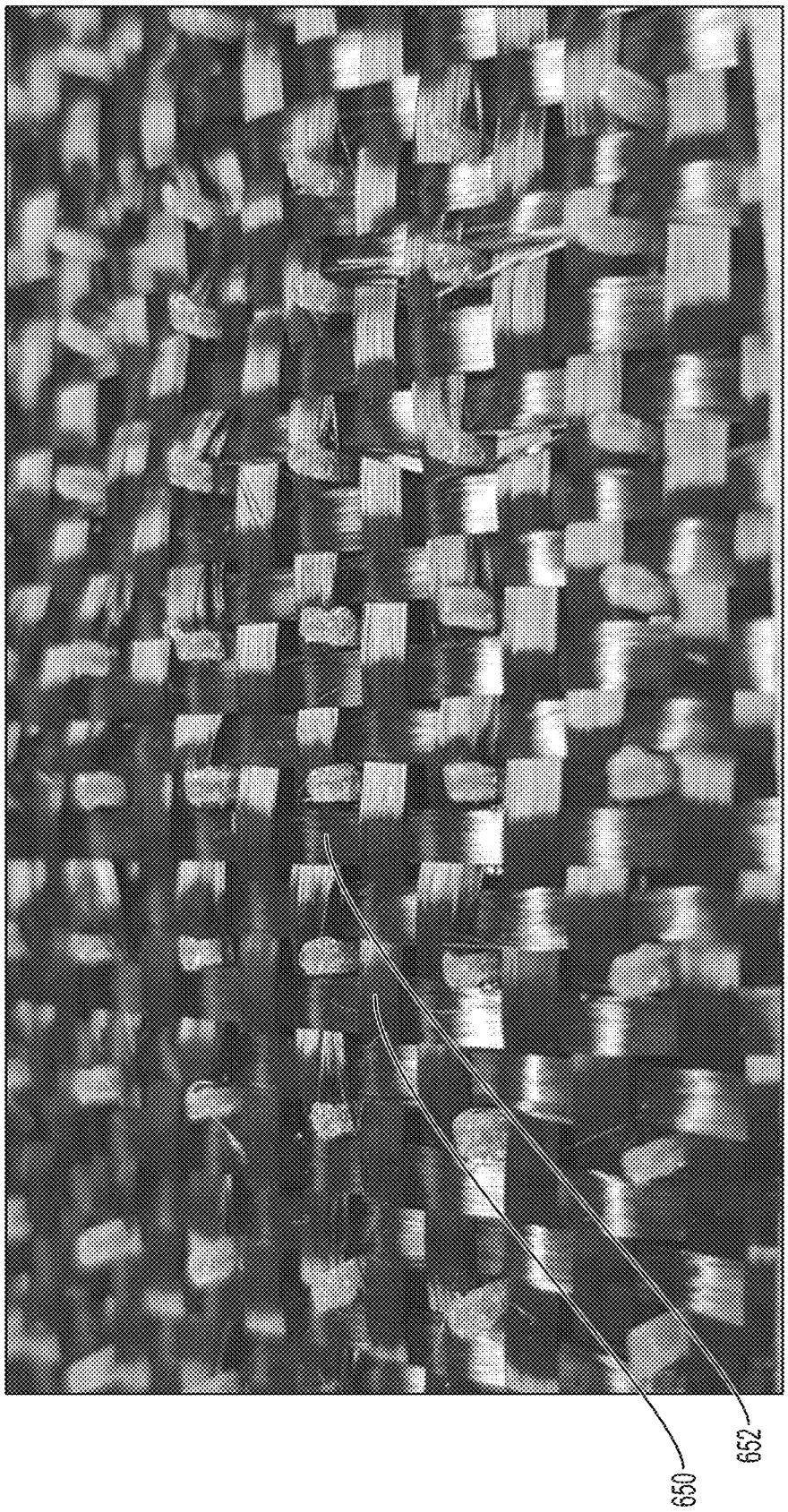

The plies (336a, 336b, 336c, 336d) that lie in different planes (346) comprise fiber tows (340a, 340b, 340c, 340d) aligned or oriented at different angles with respect to each other so as to define the pores (344) or spaces (342). In one example wherein the plies (302) comprise mats (600) (e.g., as illustrated in FIG. 6B), the fiber tows (304) in each layer (301) or ply (302) are at 90 degrees to one another and are woven together. However, in other examples, the fiber tows (340a, 340b, 340c, 340d) can be oriented at any angle (e.g., 45 degrees) with respect to each other. In one or more examples, the height H of the pin is function of how many layers (338a, 338b, 338c, 338d) or plies (336a, 336b, 336c, 336d) define the walls of the pores (344) or spaces (342). In one or more examples, the spaces (342) between the fiber tows (340a, 340b, 340c, 340d) are in an intermediate layer (338b) between the fiber tows (340a, 340c).

Figure 3H:
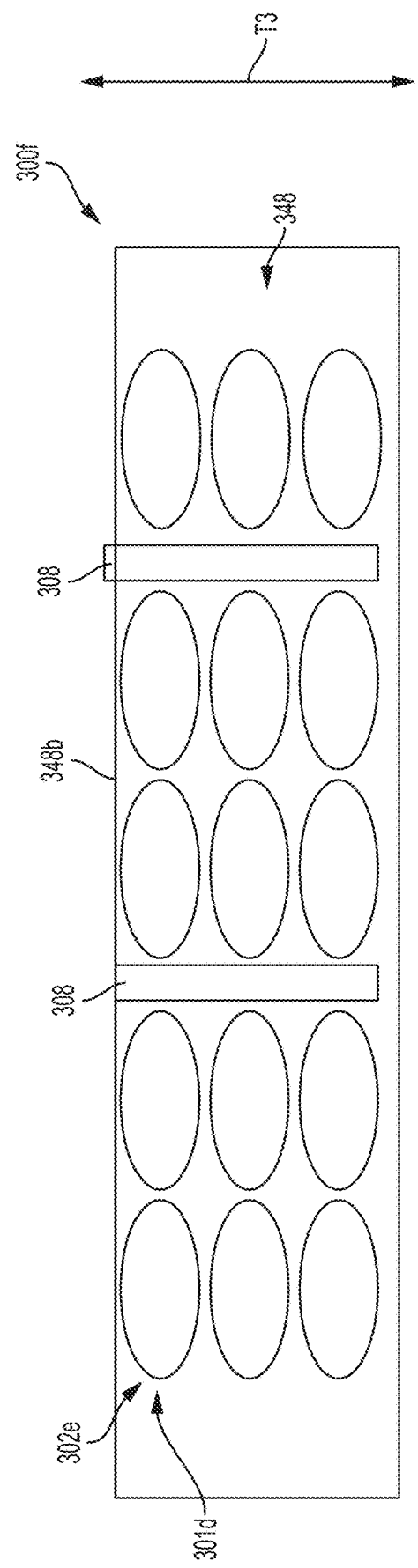
FIG. 3H illustrates a resin combined with the composite.

FIG. 3H illustrates a composite article (300f) including a resin (348) combined with the plies (302) and the pins (308), showing one or more of the pins (308) extending above and below the outermost fiber layer (301d) or outermost ply (302e) and to the resin's surface 348.

Figure 3I:
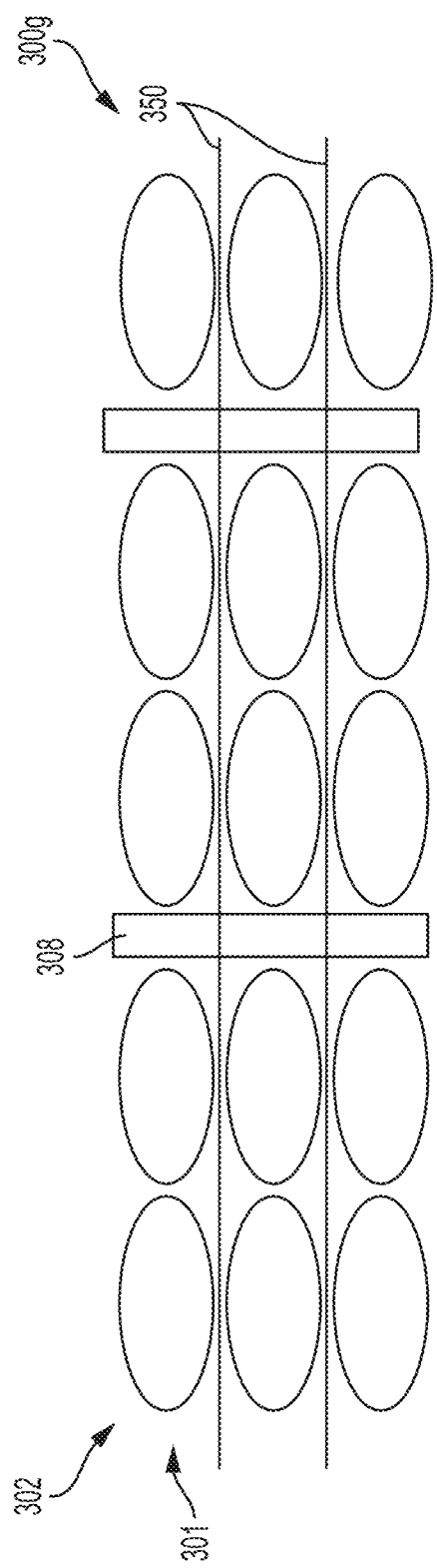

FIG. 3I illustrates a composite article (300g) wherein a layer (350) of material is deposited on either side of a ply (302) or layer (301) so that the pins (308) may couple to the layer (350) of material on either side of the ply (302) or fiber layer (301). In one or more examples, the layer (350) may comprise the same material (322) (e.g., thermoplastic) that is used to fabricate the pins (308). In one or more examples, the layer (350) comprises one or more anchors (602) or thicker deposition portions, wherein the anchors or thicker deposition portions are defined as a substrate, foundation, and/or source for the pin (308) providing the material (322) for the pin (308) and/or providing something for the pin (308) to stick to once the pin (308) is formed. In one or more further examples, the layer (350) comprises a network or web comprising filaments of material (322).

Example Manufacturing Methods

Figure 4:
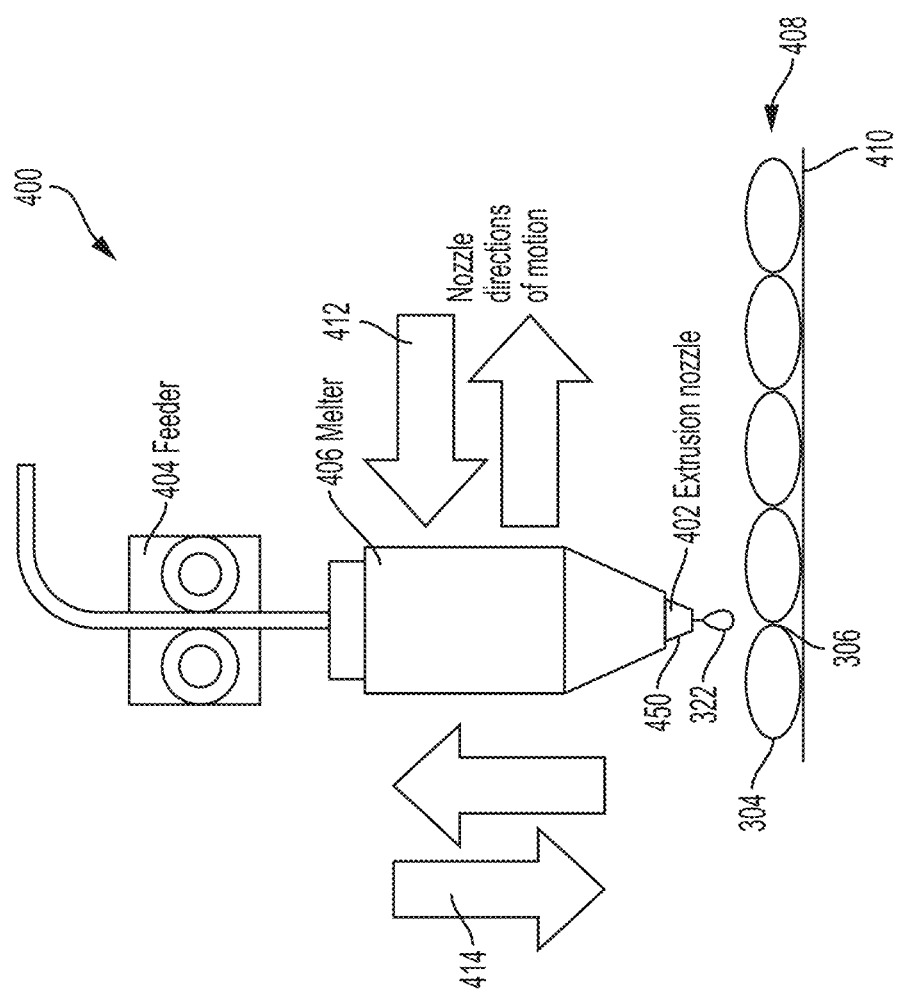
FIG. 4 illustrates an exemplary 3D printer used to manufacture the composite articles described herein.

FIG. 4 illustrates an exemplary 3D printer 400 comprising an extrusion nozzle (402), a feeder (404), and a melter (406) for feeding material (322) into pores or spaces (306) between the fiber tows so as to fabricate the pins in a z-direction (z-pins); and a platform (410) (e.g., print bed or base) for supporting the plies (302) or base layer (408) while the pins (308) are being formed. Example printers 400 include, but are not limited to, a desktop Fused Deposition Modeling (FDM) 3D printer. In one or more examples, the 3D printer is controlled using software. The platform (410) and/or the nozzle (402) are moved so that the nozzle (402) and the plies (302) or base layer (408) can be moved relative to one another in an x-y plane (412) and vertically up or down in a z-direction (414). In one or more further examples, the printer has a robot head with two end effectors (or a dual end effector), where one end effector is used for depositing the layers (301) or plies (302) including fiber tows (304) (or layups on the surface(s) of the layer(s) 301), and the other end effector is used for deposition of the bead(s) of material (322) to build the pins (308).

FIG. 5 is a flowchart illustrating a process flow for manufacturing a composite article (300a, 300b, 300c, 300d) using additive manufacturing deposition.

Block 500 represents depositing or providing a layer (301) (e.g., fiber bed or fabric layer or fibrous portion) or a ply (302) comprising fiber tows (304) separated by spaces (306) (e.g., pores). In one or more examples, the ply (302) or layer (301) is deposited using an additive manufacturing deposition technique. In exemplary embodiments, the fiber tows (304) comprise bundles of fibers. In one or more examples, the fibers comprise at least one material chosen from fiberglass, kevlar, carbon, and thermoplastic.

Block 502 represents depositing material (322) in a plurality of the spaces (306) so as to form a plurality of pins (308) each passing through a different one of the spaces (306). In one or more examples, the material (322) is deposited using an additive manufacturing deposition technique so as to form a pin (308) extending through and within each of a plurality of the spaces (306). In one or more examples, the pins (308) are drawn between the spaces (306) from an anchor (602), as illustrated in FIG. 6B.). In one or more examples, the anchor (602) is defined as a substrate, foundation, and/or source for the pin (308) providing the material (322) for the pin (308) and/or providing something for the pin (308) to stick to once the pin (308) is formed.

For example, the deposition of the material (322) comprises (i) depositing the material (322) from an outlet (450) (e.g., nozzle (402)) onto a base layer (408) and into one of the spaces (306) while moving the outlet (450) and the base layer (408) relative to one another, first in an x-y plane (412) and then in a z-direction (414), so as to form an anchor (602) on the base layer; (ii) moving the outlet (450) and the base layer (408) relative to one another with no feed of the material (322) from the outlet (450), so that a portion of the anchor (602) is drawn to create the pin (308); (iii) releasing the pin (308) or drawn material from the outlet (450) and moving the outlet (450) and the base layer (408) relative to one another so that the outlet (450) is positioned above a next one of the spaces (306); and (iv) repeating steps (i)-(iii) so as to create the plurality of the pins (308). In various examples, the base layer is a ply (302) or a layer of the material (322).

Examples of the material (322) for the pin (308) include at least one material suitable for deposition using additive manufacturing, e.g., a polymer. Example polymers include, but are not limited to, thermoplastics, such as polyamide, polyetherketone (PEK), polyether ether ketone (PEEK), polyetherketoneketone (PEKK), polyimide (PI), Polyetherimide (PEI), Ultem™, or hybrid forms of thermoplastics as previously mentioned, with modifiers and/or inclusions such as carbon nanotube(s), graphene, clay modifier(s), discontinuous fiber(s), surfactant(s), stabilizer(s), powder(s) and particulate(s).

In one or more examples, the pattern of the pins (308) (e.g., z-pins) is printed to accommodate for the pore spacing and the area of the layers (301) or plies (302), as shown in FIG. 6A. FIG. 6A illustrates a ply (302) comprising a woven (e.g., carbon) fiber mat (600) comprising discontinuous z-pins (308a) having a spacing (650) and spaces (306) (e.g., pores (306b). The mat (600) comprises orthogonal (e.g., carbon) fiber tows (650, 652) that are woven together, as illustrated in FIG. 6B. Moreover, the layers (301) or plies (302) may be carefully placed through the pattern of pins (308) so that the pins (308) go through the pores, thus minimizing breakage of the fibers in the fiber tows (304). In some embodiments where breakage of the fibers (604) in the fiber tows (304) occurs as the pins (308) are inserted, the amount of fiber breakage is reduced as compared to traditional manufacturing methods where stiff arrays of pins are forced through a stack of pre-preg plies.

The pins (308) can be fabricated with any cross-section, with control of the pin diameter D and spacing to create a range of patterns. The pin diameter D is typically greater than 0.7-mm, for a diameter of the nozzle (402) no less than 0.4-mm. An example of the variety of pin patterns or configurations that can be manufactured is shown in Table 1.

TABLE 1

| Pin configuration | "pin" diameter (mm) | Pin spacing (mm) |
|---|---|---|
| 1 | 0.7 | 5.6 |
| 2 | 0.9 | 7.6 |
| 3 | 1.1 | 9.6 |
| 4 | 0.7 | 4.1 |
| 5 | 0.9 | 5.9 |
| 6 | 1.1 | 7.4 |
| 7 | 0.7 | 3.4 |
| 8 | 0.9 | 5 |
| 9 | 1.1 | 6.2 |

In some embodiments, the pin cross-section has a similar size to the average pore area in the layer (301) or ply (302). For example, the pin (308) may fill at least 90% of a volume of the space (306). In other examples, the cross-section of the pin (308) is complimentary to the shape of the space (306), e.g., so as to provide greater contact with the sidewalls (606) formed by the fibers (604) and create greater surface contact with the pin (308). For example, if the space (306) is square, the cross-section of the pin (308) may also be square, so that the contact area of the pin (308) to the fibers (604) is maximized. In one or more exemplary applications, the pore space (306) geometry is crucial for permeability (a parameter that affects resin fill time for the preform) and risk of microcracking (larger pores or spaces (306) lead to higher risk of microcracking). In these cases, the cross section of the pins (308) may be tailored to achieve the desired permeability and reduce micro-cracking throughout the composite. In yet further examples, the cross-sections of the pins (308) are tailored to provide a surface area via a non-uniform geometry and create (force) a tortuous pathway for cracks, increasing the toughness of the composite.

Figure 6C:
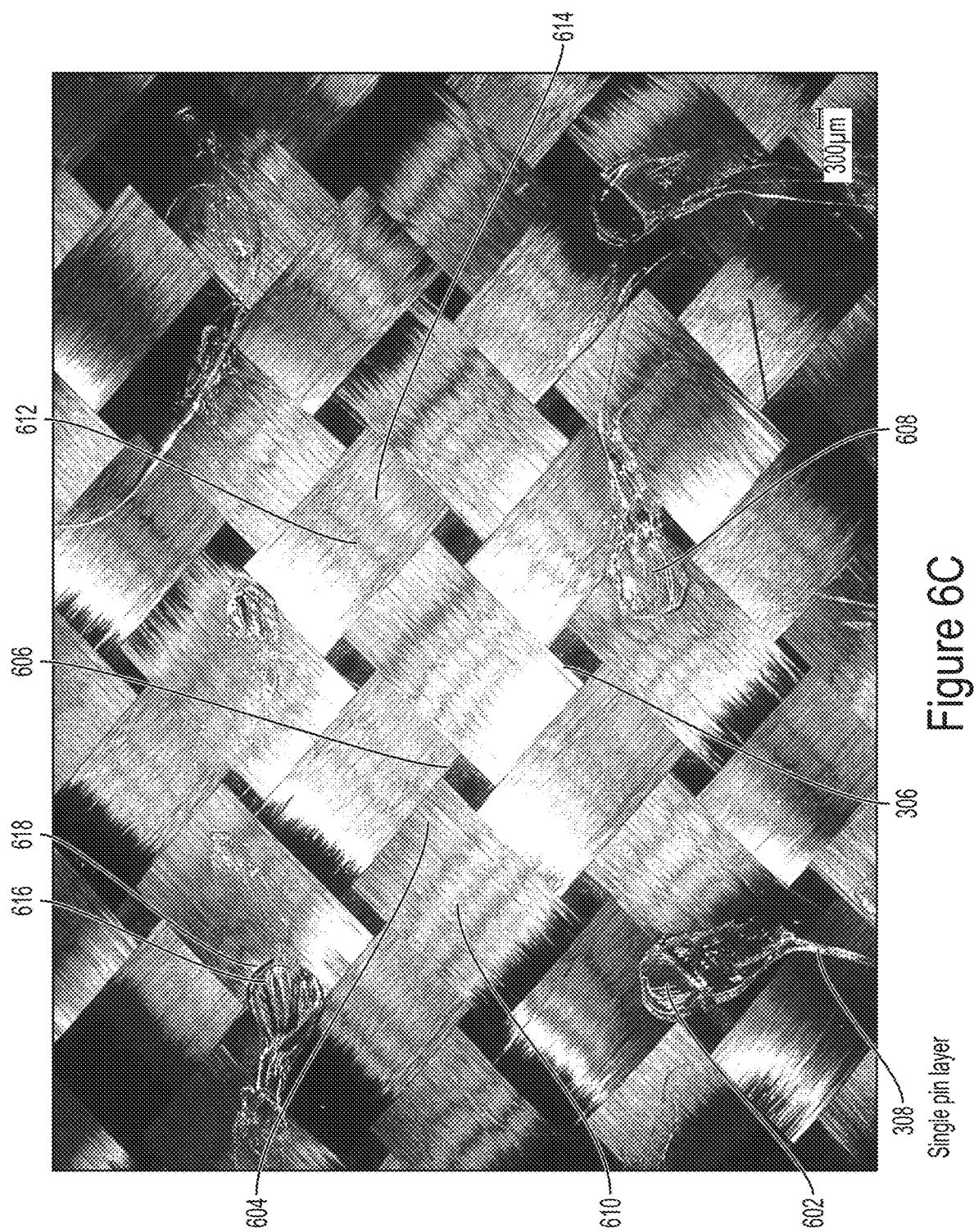

FIGS. 6B and 6C illustrate an embodiment wherein the pins (308) are bonded to the fiber tows (304) as the pins (308) are deposited as part of/during the additive manufacturing deposition process. The pins (308) may bond to the fibers (604) in a liquid or sticky state when deposited, so that portions (608) of the pins (308) are within the imperfections of the fiber surfaces (610) and thus become bonded to the fibers (604). For example, the pins (308) may bond to the fibers (604) at various controlled strength levels subject to the surface tension of the deposited material (322) and melt temperature of the material (322) in the pins (308). In one or more examples, a connection of the pins (308) to the side walls (606) of the fiber tows (304) is required to act as a "roadblock" to crack propagation along the fiber tows (304).

As further discussed below, the 3-D printing parameters (e.g., material (322) feed rate, flow rate, and nozzle (402) temperature) can be carefully tailored during deposition of each pin (308), providing the ability to locally control the material properties of the pins (308).

The material (322) for the pins (308) may be deposited in a variety of shapes, e.g., as a series of drops or beads of the material (322).

The step of Block 500 may be repeated to form or obtain a plurality of layers (301) or plies (302) deposited on top of one another, before then performing the step of Block 502, so as to form the pins (308) extending through the spaces (306) and through at least some/a plurality of the plies (302) or layers (301), after all the plurality of the layers (301) or plies (302) have been deposited. This embodiment may be useful for fabricating a skin (1004) interfacing with a stiffener (1206), as illustrated in FIG. 12, wherein layers of plies (302) in the skin (12004) are stacked before locating the drops of material (322) for the pins (308) at the interface or in an interfacial region (1008) between the skin (1004) and the stiffener (1006).

Block 504 represents optionally repeating the steps of Blocks 500-502 so as to deposit a plurality of the layers 301 or plies (302). The material (322) for each pin (308) is deposited after each layer (301) or ply (302), one ply (302) or layer (301) of fiber tows (304) at time, and at least some of the material (322) deposited in the spaces (306) in the next layer (301) or ply (302) is aligned with and connects to the material (322) deposited in the spaces (306) in the previous layer (301) or ply (302) so as to form the pins (308) extending through a plurality of the layers (301) or plies (302).

In one illustrative embodiment illustrated by reference to FIG. 3B, the process proceeds as follows. First depositions of material (322a) (e.g., thermoplastic) are selectively located or placed at or into spaces (306c) or gaps between fiber tows (304a) in a ply (302a) or layer (301a) of fiber tows (304a). A next ply (302b) or next layer (301b) of fiber tows (304b) is placed over the previous ply (302a) or previous layer (301a) of fiber tows (304a). A second deposition of material (322b) is then selectively located at or into spaces (306d) between fiber tows (304b) in the next ply (302b) of fiber tows (304b), at a location aligned with the first deposition of material (322a). The first deposition of material (322a) is then connected to the second deposition of material (322b). The process is repeated to build a preform, where the connection of material (322a, 322b) between each ply (302a, 302b) forms the pin (308) or pillar comprising the first deposition of material (322a) and the second deposition of material (322b). In some cases, the pins (308a) only extend one or more layers (301) or, in a discontinuous form through the thickness of the preform. In other cases, the pins (308b) are connected all the way through the preform, in a continuous form through the thickness. Although this example is illustrated by reference to FIG. 3B, the technique can be used in many of the examples (e.g., as illustrated in FIGS. 3A, 3C, 3D, 3F, 3H, and 3I). Furthermore, while the example is illustrated in terms of pores spaces (306c, 306d) defined or bounded by fiber tows (304a, 304b) in a single ply (302a, 302b), the first deposition of material (322a) and second deposition of material (322b) may be deposited on different plies (336a, 336b, 336c, 336d) in embodiments where spaces (342) are defined by fiber tows (340a, 340b, 340c, 340d) in different layers (338a, 338b, 338c, 338d) or plies (336a, 336b, 336c, 336d), as illustrated in FIGS. 3F and 3G.

Block 506 represents optional post processing steps after the additive manufacturing deposition steps of Blocks 500-504. In some embodiments, post-processing includes heating of the pins (308) and the plies (302) (and fiber tows (304) in the plies) (e.g., with a heat gun or oven) so as to melt or soften the pins (308) and promote or increase bonding of the pins (308) to the fibers tows (e.g., in 3-dimensions) and promote filling of the pores or spaces (306) with the pin (308).

Block 508 represents optionally combining the pins (308) and the plies (302) or layers (301) of fiber tows with resin. In some embodiments, the pins (308) also extend above and below the outermost fiber layers (301d) or plies (302) and potentially to the resin surface (348b), as illustrated in FIG. 3H.

Block 510 represents the end result, a composite article (300a, 300b, 300c, 300d, 300e, 300f, 300g) comprising a plurality of fiber tows (304); and one or more pins (308) (e.g., an array of pins (308)). One or more of the pins (308) pass through a different space (306) between/bounded by the fiber tows (304).

The method steps 500-510 may be performed so that the composite article is embodied in many ways. Examples include, but are not limited to, one or any combination of the following examples.

1. The composite article (300a-d) wherein the fiber tows (304) are disposed in a plurality of plies (302) or layers (301) and the one or more pins (308) pass through a different space (306) between the fiber tows (304) in a ply (302) or layer (301).

2. The composite article (300e) wherein the fiber tows (340a, 340b, 340c, 340d) are disposed in a plurality of plies (336a, 336b, 336c, 336d) or layers (338a, 338b, 338c, 338d), the spaces (342) are through a plurality of the layers (338a, 338b, 338c, 338d) or plies (336a, 336b, 336c, 336d), and the spaces (342) are bounded, walled, or defined by fiber tows (340a, 340b, 340c, 340d) in different layers (338a, 338b, 338c, 338d) or plies (336a, 336b, 336c, 336d), e.g., as illustrated in FIGS. 3F and 3G. The different orientations (370) of the fiber tows (340a, 340b, 340c, 340d) creates the spaces (342) between the fiber tows (340a, 340b, 340c, 340d).

3. The composite article (300a, 300b, 300c, 300d, 300e, 300f) wherein the fiber tows (304) are woven, e.g., so as to form a fiber mat or woven fabric as illustrated in FIG. 6B.

4. The composite article (300a, 300b, 300c, 300d, 300e, 300f) wherein the fiber tows (304) are arranged into braids (e.g., stitched fabric or braided fabric).

5. The composite article (300a, 300b, 300c, 300d, 300e, 3000 wherein the fiber tows (304) comprise or are arranged in braids including yarns and the pins (308) pass through spaces (306) between the yarns or between the fiber tows (304), and the yarns pass through spaces in between the spaces (306) in the ply (302)

6. The composite article (300a, 300b, 300c, 300d, 300e, 3000 wherein the fiber tows (304) are arranged in a non-crimp fabric.

7. The composite article (300a, 300b, 300c, 300d, 300e, 3000 wherein the fiber tows (304) are arranged in unidirectional tape with regular slits (comprising parallel fiber tows (304) with gaps therebetween).

8. The composite article (300a, 300b, 300c, 300d, 300e, 3000 wherein the fiber tows (304) are arranged in multi-axial reinforcements.

9. The composite article (300a, 300b, 300c, 300d, 300e, 3000 wherein the pins (308) in each layer (301) or ply (302), or in different layers (301a, 301b) or plies (302a, 302b) in the z direction, have different mechanical properties (e.g. at a location where the pin (308) joins the composite) from one another.

10. The composite article (300a, 300b, 300c, 300d, 300e, 300f) wherein one or more of the pins (308) are bonded to a surface (310) of at least one of the fiber tows (304).

11. The composite article (300a, 300b, 300c, 300d, 300e, 3000 wherein the pins (308) each fill at least 90%, at least 95%, or at least 98% of a volume of the space (306) between the fiber tows (304).

12. The composite article (300a, 300b, 300c, 300d, 300e, 3000, wherein the z-pins 308a are connected by strings (620) such as nylon strings, as illustrated in FIG. 6A.

13. The composite article (300a, 300b, 300c, 300d, 300e, 3000 wherein at least one of the fiber tows (304) comprises an undistorted fiber tow (612). In one or more examples, at least one of the pins (308) is bonded to the surface (616) of the undistorted fiber tow (612), as illustrated in FIG. 6B. In one or more examples, undistorted refers to the a lack of distortion that occurs when the pins are forced through areas of the ply that are not spaces between the fiber tows. In one or more examples, undistorted is defined as no further distortion of the fiber tow as compared to before the pin is deposited in the pore space.

14. The composite article (300a, 300b, 300c, 300d, 300e, 300f) wherein at least one of the fiber tows (304) comprises an unfrayed fiber (614). In various examples, at least one of the pins (308) is bonded to the surface (618) of the unfrayed fiber (614). In one or more examples, unfrayed refers to the lack of fraying that occurs when the pins are forced through areas of the ply that are not spaces between the fiber tows. In one or more examples, unfrayed is defined as no fraying of the fiber tow as compared to before the pin is deposited in the pore space.

15. The composite article (300c) wherein at least one of the pins (308c) is cylindrical.

16. The composite article (300b) wherein at least one of the pins (308b) has a non-uniform or irregular cross-section (330) along its length L.

17. The composite article (300b) wherein at least one of the pins (308b) is wider between the plies.

18. The composite article wherein, at every height of the pins, there is a non-uniform cross-section as function of their being only one pair of fibers that define the wall of the pin. Thus in one cross-section the pin could have a hour-glass shape but in a cross-section 90 degrees from the hour glass shaped plane the shape could be generally elliptical or circular.

19. The composite article (300f) wherein one or more of the pins (308) extend above and below the outermost fiber layer (301d) or ply (302e) and to the resin surface (348b).

20. The composite article (300a, 300b, 300c, 300d, 300e, 300f) wherein one or more of the pins (308) bond to a resin (348) and a fiber tow (304).

21. The composite article (300a, 300b, 300c, 300d, 300e, 300f) wherein one or more of the pins (308) are drawn between the spaces (306) from an anchor (602).

22. The composite article (300a, 300b, 300c, 300d, 300e, 300f, 300g) wherein a layer (350) of material is deposited on either side of a ply (302) or layer (301) so that the pins (308) may couple to the layer (350) of material on either side of the ply (302) or fiber layer (301).

23. The composite article (300a, 300b, 300c, 300d, 300e, 300f, 300g) wherein a layer (350) of material is deposited on either side of a ply (302) or layer (301) so that the pins (308) may couple to the layer (350) of material on either side of the ply (302) or fiber layer (301), and the layer (350) comprises one or more anchors (602) from which the pins (308) are drawn. The anchors are defined as a substrate, foundation, and/or source for the pin (308) providing the material (322) for the pin (308) and/or providing something for the pin (308) to stick to once the pin (308) is formed.

24. The composite article (300a) wherein at least one of the pins (308a) does not extend through all the plies (302).

25. The composite article (300b) wherein at least one of the pins (308c) extends through all of the plies (302).

26. The composite article (300a, 300b, 300c, 300d, 300e, 300f, 300g) wherein the pins (308) are uniformly distributed in the composite article (300a, 300b, 300c, 300d, 300e, 300f, 300g).

27. The composite article (300a, 300b, 300c, 300d, 300e, 300f, 300g) wherein the pins (308) are non-uniformly For example, the pins (308) may have a higher concentration is some areas and not in others (e.g., having a higher concentration where there is a joint interface and a lesser concentration away from the interface).

28. The composite article (300a, 300b, 300c, 300d, 300e, 300f, 300g) wherein the fiber tows (304) each have a diameter D1 of at least 2 mm and include at least 1000 fibers (referring to FIGS. 3C, 3D, 3E, 3H).

29. The composite article (300a, 300b, 300c, 300d, 300e, 300f, 300g) wherein the spaces (306) each have a diameter or width D2 of at least 2 mm (referring to FIGS. 3C, 3D, 3E, 3H).

30. The composite article (300a, 300b, 300c, 300d, 300e, 300f, 300g) wherein the plies (302) each have a thickness T in a range of 2-10 mm (referring to FIGS. 3C, 3D, 3E, 3H).

31. The composite article (300a, 300b, 300c, 300d, 300e, 300f, 300g) wherein the pins (308) each have a thickness or diameter D in a range of 2-5 mm (referring to FIGS. 3C, 3D, 3E, 3H).

32. The composite article (300a, 300b, 300c, 300d, 300e, 300f, 300g) wherein the pins (308) each have a length or height H in a range of 1-3 mm (referring to FIGS. 3C, 3D, 3E, 3H).

33. The composite article (300a, 300b, 300c, 300d, 300e, 300f, 300g) has a total thickness T3 in a range of 10 mm-1 meter (referring to FIGS. 3C, 3D, 3E, 3H).

34. The composite article (300a, 300b, 300c, 300d, 300e, 300f, 300g) wherein the pins (308) comprise thermoplastic material deposited as a "bead' and surface tension of the thermoplastic drives the molecules to pull inwards from the outer surface to the core.

35. The composite article (300a, 300b, 300c, 300d, 300e, 300f, 300g) wherein the pins (308) comprise at least one thermoplastic selected from polyamide, polyetherketone, polyetheretherketone, polyetherketoneketone, polyimide, polyetherimide, and polyphenylsulphone.

36. The composite article (300a, 300b, 300c, 300d, 300e, 300f, 300g) wherein the pins (308) comprise a hybrid of the thermoplastic.

37. An integrated aircraft structure (1000) or joint comprising the composite article, the joint or structure including a skin (1004), a stiffener (1006), and an interfacial region (1008) between the skin (1004) and the stiffener (1006), wherein the interfacial region (1008) comprises a composite article (300a, 300b, 300c, 300d) including fiber tows (304); a plurality of pins (308), wherein each of the pins (308) pass through a space (306) between the fiber tows (304), and each of the pins (308) are bonded to a surface (310) of at least one of the fiber tows (304); a resin (1010) combined with the plies (302) and the pins (308); and wherein the pins (308) form physical barriers (312) reducing propagation of cracks (102) in the composite article (300a, 300b, 300c, 300d, 300e, 300f, 300g). The interfacial region (1008) comprises a portion of the skin (1004), a portion of the stiffener (1006), and/or a layer between the skin (1004) and the stiffener (1006).

Case Studies

An example of 3D printed pins (308) is shown in FIGS. 7A-7D. In this case, the pins (308) were manufactured using a print temperature of 230° C. and 260° C. The drawing established a diameter D, spacing (650) of the pins (308), and length L of the pins of 0.9 mm, 3.0 mm, and 5.0 mm, respectively. In other examples, the achieved diameter D, spacing (650) and length L for the fabricated pins (308) was around 1.1 mm, 2.8 mm, and 4.9 mm, respectively. However, other dimensions are possible, e.g., as described above.

Controlling Material Properties

In one or more examples, the material properties of the additively manufactured or printed z-pins (308) are controlled and/or varied using the additive manufacturing methods described herein.

Figure 8A:
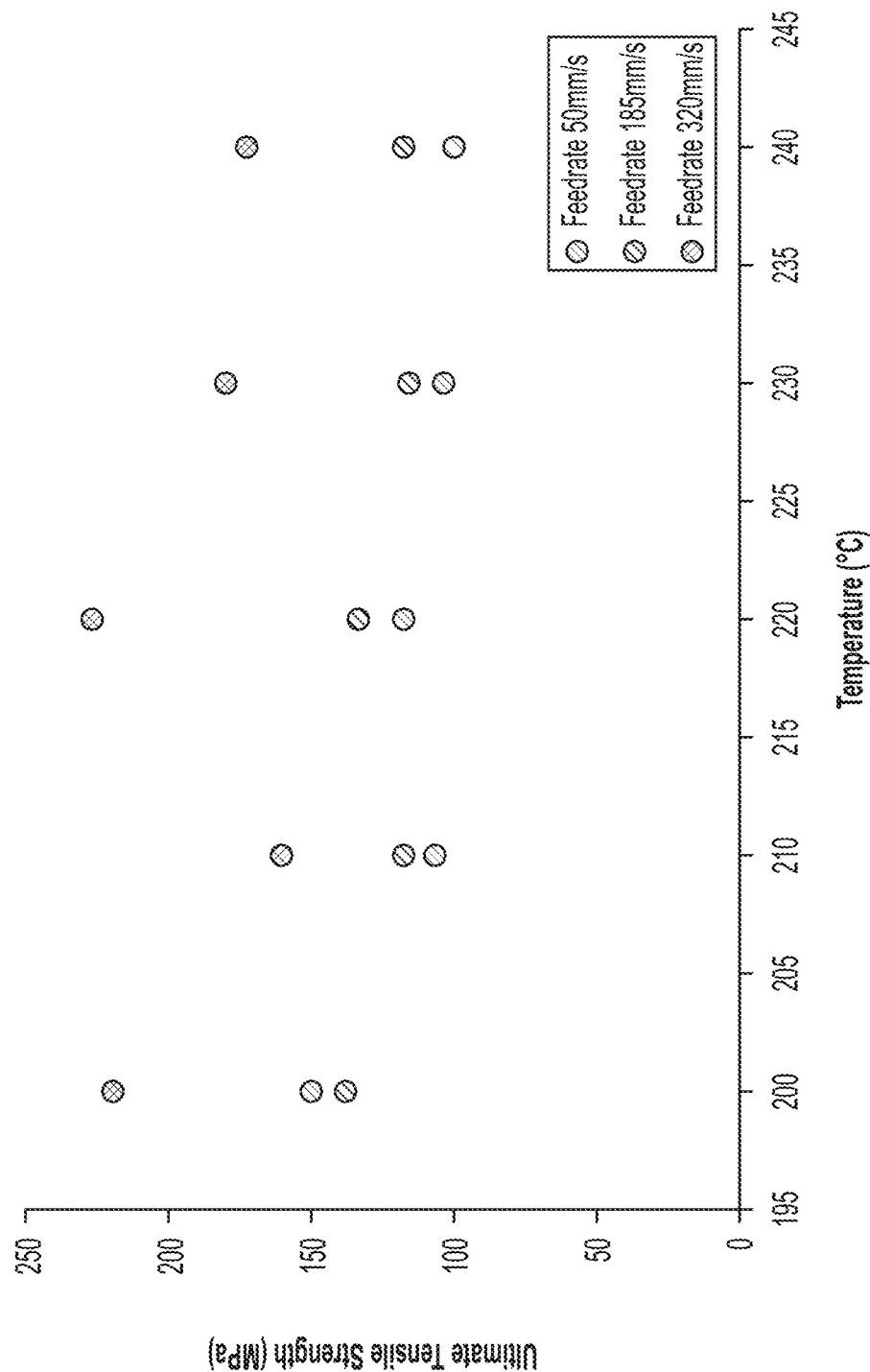
FIG. 8A illustrates variations in tensile strength of printed thermoplastic filaments over a range of print settings (feed rate of material from the print nozzle in millimeters per second, mm/s) using an exemplary 3-D printing method.
Figure 8B:
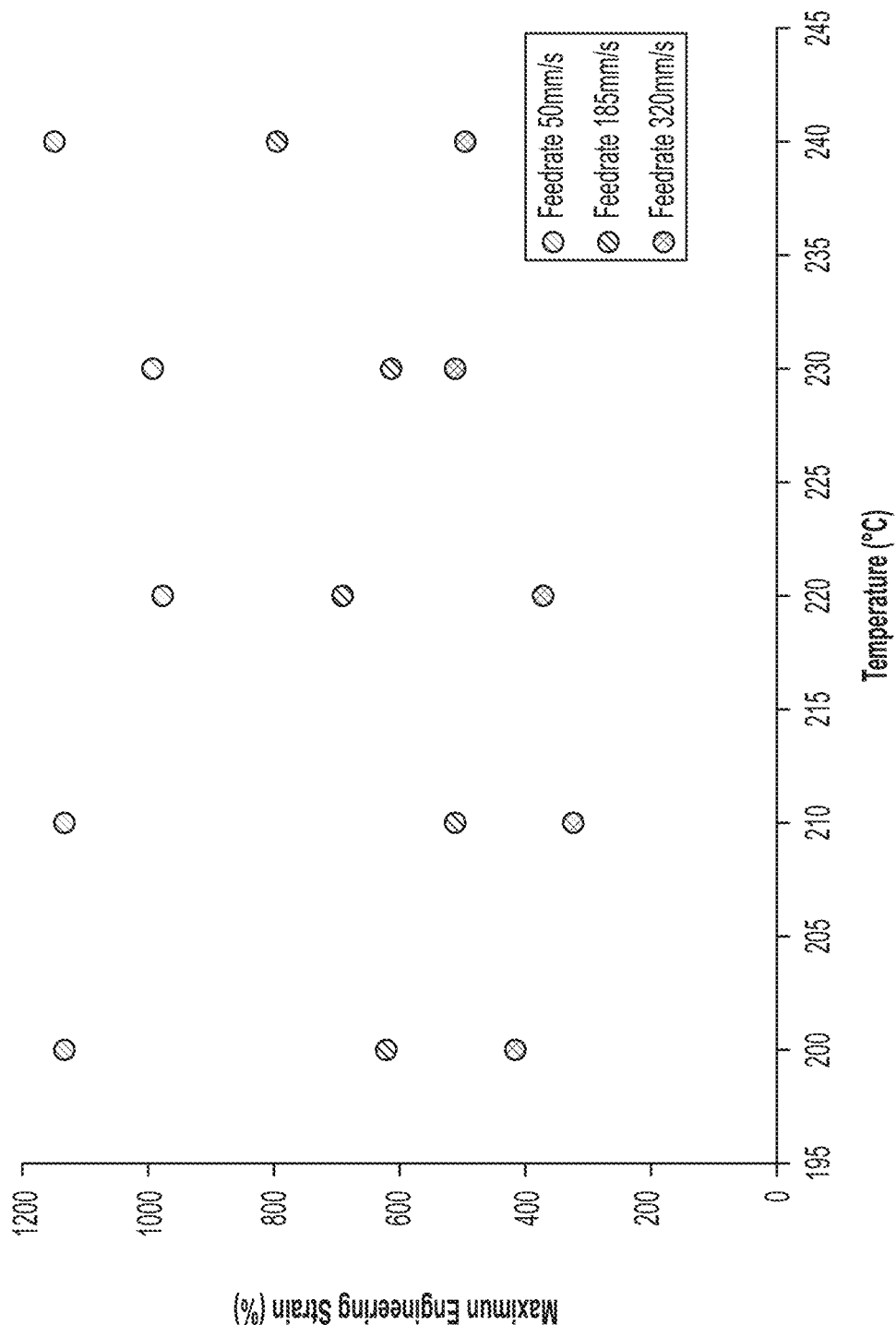
FIG. 8B illustrates variations in engineering strain of printed thermoplastic filaments over a range of print settings (feed rate of material from the print nozzle) using an exemplary 3-D printing method.

FIGS. 8A and 9B illustrate how additive manufacturing deposition conditions (nozzle temperature) changes the material properties of a material used for z-pins (308). The variations in the tensile strength and engineering strain have been included as examples, however other material properties can also be controlled through the additive manufacturing process by controlling influential printer inputs, such as feed rate, thermoplastic flow rate, and nozzle temperature.

FIG. 9A is a table illustrating example process parameters for fabrication of continuous z-pins (308b) (at least one of the pins (308) extends through all of the plies), for any of the embodiments described herein that use continuous z-pins (308c).

FIG. 9B is a table illustrating example process parameters for fabrication of discontinuous z-pins (308a) (i.e., at least one of the pins (308) does not extend through all the plies), for any of the embodiments described herein that use discontinuous z-pins (308a).

In various examples, the composite article (300a, 300b, 300c, 300d) includes any combination of the following:

Control of printing parameters assists in producing high-performance interlayer technologies comprising laminated composite material with tailored properties for particular system applications. Conventional assembly techniques can only process at a single setting for the entire architecture, and therefore cannot vary material properties on a location by location basis as provided for by exemplary embodiments described herein.

Example Applications

In one or more embodiments, the z-pin networks described herein are used to toughen composites used on aircraft, particularly at high stress concentration regions where mode I or mode II interlaminar loads are experienced, e.g., in an Integrated Aircraft Structure (IAS). Integrated Aircraft Structures are currently being joined by fasteners that provide a source of redundancy to encourage predictable failure in an otherwise brittle epoxy due to the poor fracture toughness properties of composites. However, the primary problem with using fasteners is the increased weight they induce as parts are often made thicker than necessary to account for the high stress concentrations from the fastener holes. Additionally, composite failure due to bolts and fasteners initiates locally at the hole but then tends to propagate in the through-thickness direction. By increasing the fracture toughness and providing a means for a more predictable failure, IAS can be joined more effectively using composite articles described herein. More specifically, illustrative embodiments described herein improve mode I and mode II fracture toughness and provide a way for stable composite failure needs to be addressed, by either reducing the number of fasteners used for connecting composite parts, or by minimizing the safety factor that is applied to part thickness when being mechanically joined.

Figure 10:
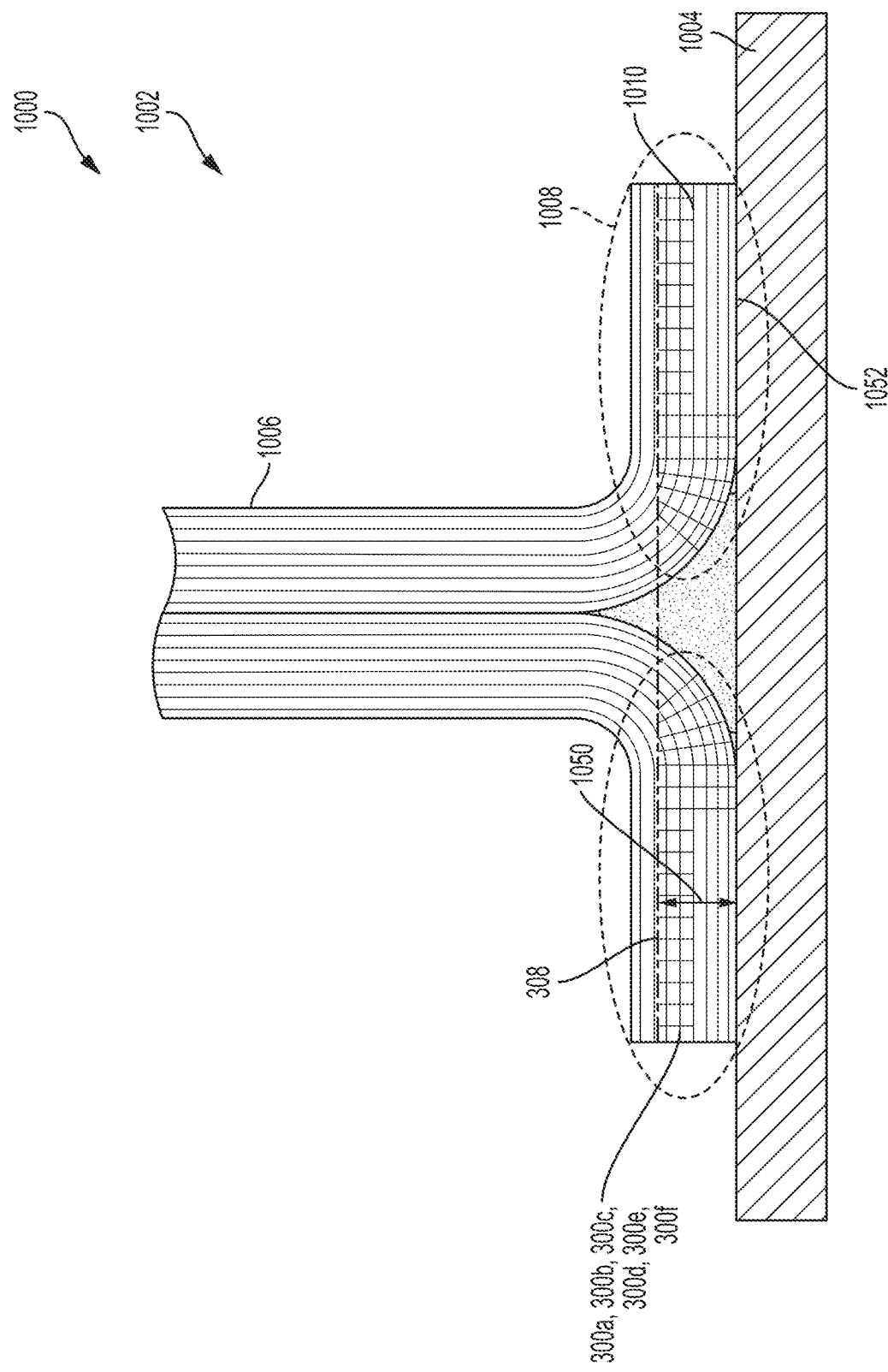
FIG. 10 illustrates an integrated aircraft structure including a composite article as described herein.

FIG. 10 illustrates an integrated aircraft structure 1000 (a T-joint 1002) comprising a skin (1004), a stiffener 1006 (e.g., blade or top hat stiffener), and an interfacial region 1008 between the skin (1004) and the stiffener (1006). The interfacial region (1008) comprises a composite article (300a, 300b, 300c, 300d) as described herein, including a plurality of plies (302) each including fiber tows (304); and a plurality of pins (308) wherein each of the pins (308) pass through a different space (306) between the fiber tows (304) and each of the pins (308) are bonded to a surface (310) of at least one of the fiber tows (304). The pins (308) form physical barriers reducing propagation of cracks in the composite article (300a, 300b, 300c, 300d). In various examples, the composite article (300a, 300b, 300c, 300d) further comprises a resin (1010) combined with the plies (302) and the pins (308) so that the pin (308) is built through the pore space (306) bonds to the resin (1010) and a surface of the fiber tow (304) and is anchored to an anchor (602).

The interfacial region (1008) may comprise a portion of the skin (1004), a portion of the stiffener (1006), and/or a layer between the skin (1004) and the stiffener (1006). In various examples, the pins (308) are only where the support member contacts the composite. Other structures that can incorporate the composite article include, but are not limited to, a panel. In some embodiments, the pins (308) are only be located on the edges of the panel to increase perimeter strength. Selective location of the pins (308) (e.g., only in the interfacial region or at the perimeter) enable weight savings by only including the pins where toughening is needed. In one or more examples, the tops T5 (see FIG. 3E) of the pins (308) closest to the skin (1002) are located at a distance 1050 up to 10 cm from the perimeter or interface 1052 between the skin (1002) and the stiffener (1006).

However, the z-pin structures according to embodiments of the present invention may be used in any applications (e.g., structural or semi-structural components) that require improvement in the damage tolerance of composites.

Advantages and Improvements

Conventional techniques for toughening of liquid molded manufactured composites include using a thermoplastic veil. However, the thermoplastic veil is layer specific and provides only a moderate improvement compared to through thickness toughening techniques. Moreover, conventional toughening techniques are not employed due to manufacturing limitations and/or microstructural defects induced during the manufacturing process.

Illustrative toughening methods presented herein include a novel method for fabricating z-pins and a new method for using the z-pins in a liquid molded composites made out of porous plain weave fiber mats. One goal of the new manufacturing methods presented herein is to minimize microstructural defects. Conventional methods do not provide for placing a continuous through thickness toughening mechanism around the carbon tows with the primary goal of minimizing microstructural defects in order for the end composite to maintain its in-plane properties. Moreover, conventional metal z-pins are fabricated separately and then physically forced (e.g., nailed) through a stack of dry fiber mats/prepreg plies, rather than printing pins between the pore spacing to ensure that fiber breakage is minimized, as can be achieved using illustrative embodiments described herein. In addition, to the best of the inventors' knowledge, conventional z pins are fabricated from carbon fiber/BMI or metal, not thermoplastic or high ductility material as can be achieved using the exemplary processes described herein.

Processing Environment

Figure 11:
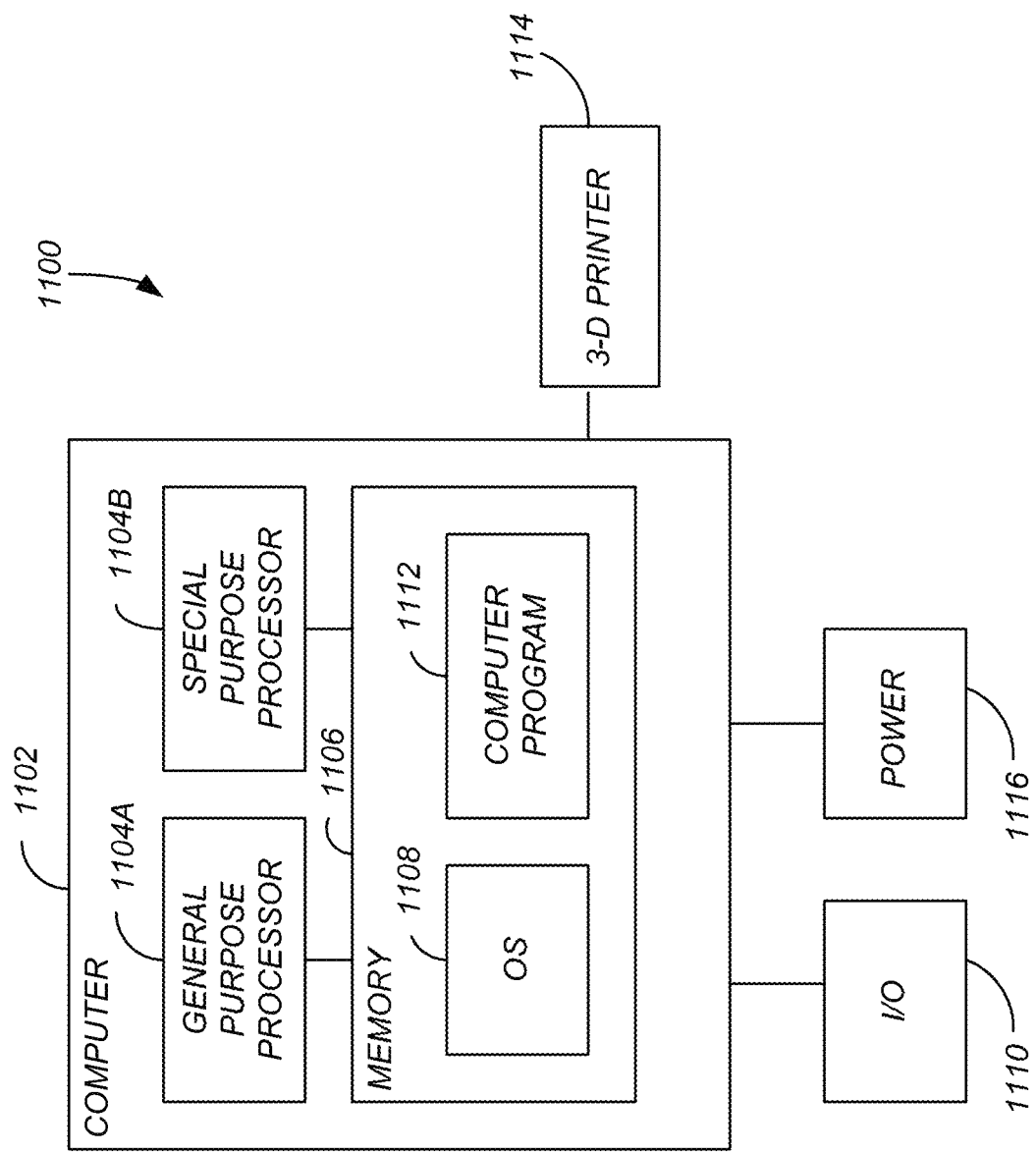
FIG. 11 is an example computer hardware environment for controlling the printer so as to fabricate the composite article including pins according to embodiments of the present disclosure.

FIG. 11 illustrates an exemplary system 1100 used to implement processing elements needed to control the 3D printers (400) described herein.

The computer 1102 comprises a processor 1104 (general purpose processor 1104A and special purpose processor 1104B) and a memory, such as random access memory (RAM) 1106. Generally, the computer 1102 operates under control of an operating system 1108 stored in the memory 1106, and interfaces with the user/other computers to accept inputs and commands (e.g., analog or digital signals) and to present results through an input/output (I/O) module 1110. The computer program application 1112 accesses and manipulates data stored in the memory 1106 of the computer 1102. The operating system 1108 and the computer program 1112 are comprised of instructions which, when read and executed by the computer 1102, cause the computer 1102 to perform the operations herein described. In one embodiment, instructions implementing the operating system 1108 and the computer program 1112 are tangibly embodied in the memory 1106, thereby making one or more computer program products or articles of manufacture capable of performing the printing methods described herein (e.g., as described in FIG. 5). As such, the terms "article of manufacture," "program storage device" and "computer program product" as used herein are intended to encompass a computer program accessible from any computer readable device or media.

Those skilled in the art will recognize many modifications may be made to this configuration without departing from the scope of the present disclosure. For example, those skilled in the art will recognize that any combination of the above components, or any number of different components, peripherals, and other devices, may be used.

CONCLUSION

This concludes the description of the preferred embodiments of the present disclosure. The foregoing description of the preferred embodiment has been presented for the purposes of illustration and description. It is not intended to be exhaustive or to limit the disclosure to the precise form disclosed. Many modifications and variations are possible in light of the above teaching. It is intended that the scope of rights be limited not by this detailed description, but rather by the claims appended hereto.

What is claimed is:

1. A composite article, comprising:
fiber tows, each comprising a bundle of fibers;
pins, passing through spaces that are bounded by the fiber tows; and
a resin that surrounds the fiber tows and the pins;
wherein:
the fiber rows are located in plies;
at least two of adjacent ones of the fiber tows are in different ones of the plies;
each of the spaces extends through the plies and is bounded by the adjacent ones of the fiber tows;
each of the pins extends into only one of the spaces;
at least one of the pins extends through only some of the plies;
each of the pins is bonded to a surface of at least one of the fiber tows; and
the pins form physical barriers that reduce propagation of cracks in the composite article.

2. The composite article of claim 1, wherein:
each of the pins has a length from 1 mm to 3 mm.

3. The composite article of claim 1, wherein the pins have different mechanical properties from one another.

4. The composite article of claim 1, wherein each of the pins fills at least 90% of a volume of each of the spaces, bounded by fiber tows.

5. The composite article-of claim 1, wherein:
at least one of the fiber tows comprises an undistorted fiber tow that is not distorted by insertion of the pins into the plies; and
at least one of the pins is bonded to, and is in contact with, the surface of the undistorted fiber tow.

6. The composite article of claim 1, wherein:
at least one of the fiber tows comprises an unfrayed fiber, and
at least one of the pins is bonded to the surface of the unfrayed fiber.

7. A composite article, comprising:
fiber tows, each comprising a bundle of fibers;
pins, passing through spaces that are bounded by the fiber tows; and
a resin that surrounds the fiber tows and the pins;
wherein:
at least one of the pins has a corrugated surface along its length L;
each of the pins is bonded to a surface of at least one of the fiber tows; and
the pins form physical barriers that reduce propagation of the cracks in the composite article.

8. The composite article of claim 1, wherein at least one of the pins has a cross-section, varying along its length so that the at least one of the pins is wider between the plies than in the plies.

9. The composite article of claim 1, wherein the pins bond to the resin and the fiber tows.

10. The composite article of claim 1, further comprising a base layer and a plurality of anchors on the base layer, wherein each of the pins is drawn between the spaces from a different one of the anchors.

11. The composite article of claim 1, wherein at least one of the pins extends through all of the plies.

12. The composite article of claim 1, wherein:
the composite article further comprises a layer of material, deposited on either side of each of the plies;
the pins couple to the layer of material on either side of each of the plies; and
the plies comprise a fabric.

13. An integrated aircraft structure, comprising:
a skin, comprising the composite article of claim 1;
a stiffener; and
an interface between the skin and the stiffener,
wherein the composite article of the skin is located adjacent the interface.

14. A method of manufacturing a composite article, the method comprising steps of:
(a) depositing material in spaces, bounded by fibers tows, each comprising a bundle of fibers, so as to form pins, each passing through a different one of the spaces, wherein the step (a) comprises steps of:
(i) depositing the material from an outlet onto a base layer and into one of the spaces while moving the outlet and the base layer relative to one another, first in an x-y plane and then in a z-direction, so as to form an anchor on the base layer;
(ii) moving the outlet and the base layer relative to one another with no feed of the material from the outlet, so that a portion of the anchor is drawn to create each of the pins;

(iii) releasing each of the pins from the outlet and moving the outlet and the base layer relative to one another so that the outlet is positioned above a next one of the spaces; and (iv) repeating the steps (i)-(iii) so as to create the pins.

15. The method of claim 14, wherein the fiber tows are located in plies, the method further comprising, repeating the step (a) so that the material is deposited in the spaces after each one of the plies is deposited, wherein at least some of the material deposited in the spaces in a next one of the plies is aligned with and connects to the material deposited in the spaces in a previous one of the plies so as to form the pins, extending through the plies.

16. The method of claim 14, further comprising:

depositing a stack of plies, comprising the fiber tows; and performing the step (a) so as to form the pins, extending through at least some of the plies.

17. The method of claim 14, further comprising heating the pins and the fiber tows in a post-processing step after the pins have been formed, so as to increase bonding of the pins to the fiber tows.

18. The method of claim 14, further comprising depositing the material using an additive manufacturing technique comprising three dimensional printing, wherein the pins bond to the fiber tows during the deposition of the material using the additive manufacturing technique.

19. The method of claim 14, wherein:

the fiber tows are located in plies;

each of the fiber tows has a diameter of at least 2 mm and comprises at least 1000 fibers, each comprising at least one material, chosen from thermoplastic, fiberglass, Kevlar, and carbon;

each of the spaces has a diameter of at least 2 mm;

each of the plies has a thickness from 2 to 10 mm;

each of the pins has a thickness from 2 to 5 mm and comprises at least one thermoplastic, selected from polyamide, polyetherketone, polyetheretherketone, polyetherketoneketone, polyimide, polyetherimide, and polyphenylsulphone, and hybrids thereof;

each of the pins has a length from 1 to 3 mm; and the composite article has a total thickness from 10 mm to 1 meter.

20. The method of claim 14, wherein at least one of the pins has a corrugated surface along its length L.

21. An integrated aircraft structure, comprising-:

a skin;

a stiffener, comprising the composite article of claim 1; and an interface between the skin and the stiffener, wherein the composite article of the stiffener is located adjacent the interface.

22. An integrated aircraft structure, comprising:

a skin;

a stiffener; and an interface between the skin and the stiffener, wherein the interface comprises the composite article of claim 1.

* * * * *